(12) United States Patent
Yasui et al.

(10) Patent No.: US 9,616,865 B2
(45) Date of Patent: Apr. 11, 2017

(54) BRAKING CONTROL DEVICE FOR VEHICLE

(71) Applicants: Yoshiyuki Yasui, Nagoya (JP);
Hiroyuki Kodama, Kariya (JP);
Naotoshi Satake, Nagoya (JP)

(72) Inventors: Yoshiyuki Yasui, Nagoya (JP);
Hiroyuki Kodama, Kariya (JP);
Naotoshi Satake, Nagoya (JP)

(73) Assignee: ADVICS CO., LTD., Kariya-Shi, Aichi (JP)

(*) Notice: Subject to any disclaimer, the term of this patent is extended or adjusted under 35 U.S.C. 154(b) by 169 days.

(21) Appl. No.: 14/369,255

(22) PCT Filed: Dec. 25, 2012

(86) PCT No.: PCT/JP2012/083440
§ 371 (c)(1),
(2) Date: Dec. 2, 2014

(87) PCT Pub. No.: WO2013/099850
PCT Pub. Date: Jul. 4, 2013

(65) Prior Publication Data
US 2015/0081186 A1 Mar. 19, 2015

(30) Foreign Application Priority Data
Dec. 27, 2011 (JP) ................. 2011-284590

(51) Int. Cl.
*B60T 8/173* (2006.01)
*B60T 8/171* (2006.01)
(Continued)

(52) U.S. Cl.
CPC .............. *B60T 8/173* (2013.01); *B60T 7/042* (2013.01); *B60T 8/171* (2013.01); *B60T 13/741* (2013.01);
(Continued)

(58) Field of Classification Search
CPC ........ B60T 8/173; B60T 13/741; B60T 17/22; B60T 7/042; F16D 65/18
See application file for complete search history.

(56) References Cited

U.S. PATENT DOCUMENTS 5,959,430 A * 9/1999 Yuki ..................... H02P 21/085
318/805
6,070,682 A * 6/2000 Isogai ................ B60K 31/0008
180/167
(Continued)

FOREIGN PATENT DOCUMENTS

| JP | 9-60547 A | 3/1997 |
|---|---|---|
| JP | 2002-225690 A | 8/2002 |

(Continued)

OTHER PUBLICATIONS

International Search Report (PCT/ISA/210) mailed on Apr. 16, 2013, by the Japanese Patent Office as the International Searching Authority for International Application No. PCT/JP2012/083440.
(Continued)

*Primary Examiner* — Adam Tissot
*Assistant Examiner* — Aaron Smith
(74) *Attorney, Agent, or Firm* — Buchanan Ingersoll & Rooney PC

(57) ABSTRACT

Based on a difference ($\Delta Fb$) between a target value (Fbt) and an actual value (Fba) of a friction member force for pressing a brake disc, a feedback energization amount (Ipt) is calculated using a proportional gain smaller than an ultimate sensitivity gain. If $\Delta Fb$ falls within a fluctuation range of torque ripple, a first compensation energization amount (Ibt) is calculated using a proportional gain larger than the ultimate sensitivity gain, and if $\Delta Fb$ falls outside the fluctuation range, the first compensation energization amount (Ibt) is calculated to be constant. A second compensation energization amount (Ift) is calculated based on a calculation
(Continued)

characteristic that is preset based on a torque fluctuation over a predetermined range of an electric motor position and based on an actual position of the electric motor. An indication energization amount calculated according to Fbt is adjusted by Ipt, Ibt, and Ift to calculate a target energization amount.

7 Claims, 10 Drawing Sheets

(51) Int. Cl.
| | |
|---|---|
| *F16D 65/18* | (2006.01) |
| *B60T 7/04* | (2006.01) |
| *B60T 13/74* | (2006.01) |
| *B60T 17/22* | (2006.01) |
| *F16D 66/00* | (2006.01) |
| *F16D 125/40* | (2012.01) |
| *F16D 125/48* | (2012.01) |

(52) U.S. Cl.
CPC .............. *B60T 17/22* (2013.01); *F16D 65/18* (2013.01); *F16D 2066/005* (2013.01); *F16D 2125/40* (2013.01); *F16D 2125/48* (2013.01)

(56) References Cited

U.S. PATENT DOCUMENTS

| | | | |
|---|---|---|---|
| 7,002,314 B2* | 2/2006 | Arakawa | B60T 13/741 |
| | | | 318/566 |
| 2008/0201041 A1 | 8/2008 | Jiang | |
| 2010/0244755 A1 | 9/2010 | Kinugasa et al. | |
| 2013/0119900 A1* | 5/2013 | Xiang | H02P 21/05 |
| | | | 318/400.02 |

FOREIGN PATENT DOCUMENTS

| | | |
|---|---|---|
| JP | 2003-106356 A | 4/2003 |
| JP | 2008-189225 A | 8/2008 |
| JP | 2010-239681 A | 10/2010 |

OTHER PUBLICATIONS

Written Opinion (PCT/ISA/237) mailed on Apr. 16, 2013, by the Japanese Patent Office as the International Searching Authority for International Application No. PCT/JP2012/083440.

* cited by examiner

BRAKING CONTROL DEVICE FOR VEHICLE

TECHNICAL FIELD

The present invention relates to a vehicle brake control device.

BACKGROUND ART

Hitherto, there has been known a vehicle brake control device configured to generate a braking torque by an electric motor. In this type of device, typically, an indicator current (target current) is calculated based on an operation amount of a braking operation member for the vehicle by a driver, and the electric motor is controlled based on the indicator current, Then, a braking torque that depends on the operation of the braking operation member is applied to the wheels.

In this type of device, it is desired to compensate for the effects of a friction, which is inevitably generated in a transmission system for a torque of the electric motor. Japanese Patent Application Laid-open No. 2002-225690 describes a hysteresis compensation as one of friction compensations. Specifically, Japanese Patent Application Laid-open No. 2002-225690 has a description "When an indicator current serving as an input to a brake actuator is increasing, a current obtained by adding a compensating current to the indicator current itself so that the amount of loss due to hysteresis is added is used as a compensated indicator current, whereas the indicator current itself is used as the compensated indicator current when the indicator current is in a maintained state. Moreover, when the indicator current is dropping, a current obtained by subtracting the compensating current from the indicator current itself so that the amount of excess due to the hysteresis is eliminated is used as the compensated indicator current. Then, based on the compensated indicator current, the brake actuator is controlled".

SUMMARY OF INVENTION

By the way, even when the hysteresis is compensated for in the manner described above, it is sometimes difficult to ensure accuracy of a pressing force of the brake actuator (that is, accuracy of the braking torque on a wheel) in terms of a relationship with a torque ripple of the electric motor. This problem is described referring to FIG. 11. The torque ripple refers to a fluctuation of an output (torque), which is generated for a positional change (rotation) of the electric motor.

FIG. 11(a) shows a torque ripple characteristic which repeatedly fluctuates with an approximately constant period and width over one revolution of the electric motor. FIG. 11(b) shows a relationship between an electric motor output (output torque) Tqm and a force (pressing force) Fba of friction members (brake pad) for pressing a rotating member (brake disc) on a hysteresis characteristic of the brake actuator. FIGS. 11(c) and 11(d) show time-series waveforms indicating changes of a target energization amount (target current) Imt, the output torque Tqm of the electric motor, and the pressing force Fba when a braking torque on the wheel is increased and decreased, respectively.

First, the case where the braking torque on the wheel is increased is described. As shown in FIG. 11(c), for example, the target energization amount Imt is increased with a constant gradient with respect to time T (see the alternate long and short dash line) to increase the output torque Tqm of the electric motor. At this time, the output torque Tqm increases while fluctuating as A-B-C-D-E (indicated by the broken line) due to the torque ripple. As a result, on the hysteresis characteristic shown in FIG. 11(b), the Fba increases over the section A-B in which the Tqm increases, but, while the Tqm decreases to return to the Tqm corresponding to the point B (B-C-D), the Fba falls within the hysteresis characteristic. As a result, the Fba is kept constant. When the Tqm increases to become larger than the Tqm corresponding to the point B, the Fba increases again (D-E). Specifically, due to the fluctuation of the Tqm and the hysteresis characteristic, the actual pressing force Fba is output in a stepwise fashion as indicated by the solid line. As a result, the accuracy (resolution) of the braking torque is lowered. This phenomenon becomes a problem, in particular, when the braking torque is increased gently.

Next, the case where the braking torque on the wheel is decreased is described. Similarly to the case described above, the target energization amount Imt is decreased with a constant gradient with respect to time T (see the alternate long and short dash line) to decrease the output torque Tqm of the electric motor. At this time, the output torque Tqm decreases while fluctuating as F-G-H-J-K (indicated by the broken line) due to the torque ripple. As a result, on the hysteresis characteristic, the Fba decreases over the section F-G in which the Tqm decreases, but, while the Tqm increases to return to the Tqm corresponding to the point G (section G-H-J), the Fba falls within the hysteresis. As a result, the Fba is kept constant. When the Tqm decreases to become smaller than the Tqm corresponding to the point G, the Fba decreases again (J-K). Specifically, due to the fluctuation of the Tqm and the hysteresis, the actual pressing force Fba is output in a stepwise fashion as indicated by the solid line. As a result, the accuracy (resolution) of the braking torque is lowered. This phenomenon becomes a problem, in particular, when the braking torque is decreased gently.

The present invention has been made to solve the problem described above, and has an object to provide a brake control device capable of compensating for the effects of a torque ripple of an electric motor to improve control accuracy (resolution) for a braking torque on a wheel.

According to one embodiment of the present invention, there is provided a vehicle brake control device, including: operation amount acquisition means (BPA) for acquiring an operation amount (Bpa) of a braking operation member (BP) for a vehicle by a driver; braking means (BRK) for pressing a friction member (MSB) against a rotating member (KTB) fixed to a wheel (WHL) of the vehicle through intermediation of an electric motor (MTR) to generate a braking torque for the wheel (WHL); control means (CTL) for calculating a target energization amount (Imt) based on the operation amount (Bpa) and controlling the electric motor (MTR) based on the target energization amount (Imt); and actual correlation value acquisition means (MKA, FBA, SVA) for acquiring an actual correlation value (Mka, Fba, Sva) correlated with an actual pressing force of the friction member (MSB) on the rotating member (KTB).

The present invention has a feature in that the control means (CTL) is configured as follows. Specifically, a target correlation value (Mkt, Fbt, Svt) correlated with a target pressing force of the friction member (MSB) on the rotating member (KTB) is calculated based on the operation amount (Bpa). A difference between the target correlation value (Mkt, Fbt, Svt) and the actual correlation value (Mka, Fba, Sva) is calculated as a correlation value deviation (ΔMk, ΔFb, ΔSv). A feedback energization amount (Ipt) for adjusting the target energization amount (Imt) to make the correlation value deviation (ΔMk, ΔFb, ΔSv) closer to zero is calculated based on the correlation value deviation (ΔMk, ΔFb, ΔSv). The feedback energization amount (Ipt) has a characteristic of monotonically increasing with respect to an increase of the correlation value deviation (ΔMk, ΔFb, ΔSv). A first compensation energization amount (Ibt) for adjusting the target energization amount (Imt) to compensate for an effect of a torque ripple of the electric motor (MTR) is calculated based on the correlation value deviation (ΔMk, ΔFb, ΔSv). The first compensation energization amount (Ibt) has a characteristic of monotonically increasing with respect to an increase of the correlation value deviation (ΔMk, ΔFb, ΔSv) from zero to a predetermined value (mk2, fb4) and becoming constant with respect to an increase of the correlation value deviation (ΔMk, ΔFb, ΔSv) from the predetermined value (mk2, fb4). It is preferred that the predetermined value (mk2, fb4) be a value corresponding to a fluctuation range of the torque ripple of the electric motor (MTR). Then, the target energization amount (Imt) is calculated based on the feedback energization amount (Ipt) and the first compensation energization amount (Ibt).

Alternatively, when the control means (CTL) includes wheel speed acquisition means (VWA) for acquiring a speed (Vwa) of the wheel (WHL), the present invention has a feature in that the control means (CTL) is configured as follows. Specifically, based on the speed (Vwa) of the wheel (WHL), a slip state quantity (Svw, dVw) indicating a slip state of the wheel is calculated. Based on the slip state quantity (Svw, dVw), the target correlation value (Mkt, Fbt, Svt) correlated with the target pressing force of the friction member (MSB) on the rotating member (KTB) is calculated. The difference between the target correlation value (Mkt, Fbt, Svt) and the actual correlation value (Mka, Fba, Sva) is calculated as the correlation value deviation (ΔMk, ΔFb, ΔSv). Based on the correlation value deviation (ΔMk, ΔFb, ΔSv), the feedback energization amount (Ipt) for adjusting the target energization amount (Imt) to make the correlation value deviation (ΔMk, ΔFb, ΔSv) closer to zero is calculated. The feedback energization amount (Ipt) has the characteristic of monotonically increasing with respect to the increase of the correlation value deviation (ΔMk, ΔFb, ΔSv). Based on the correlation value deviation (ΔMk, ΔFb, ΔSv), the first compensation energization amount (Ibt) for adjusting the target energization amount (Imt) to compensate for the effects of the torque ripple of the electric motor (MTR) is calculated. The first compensation energization amount (Ibt) has the characteristic of monotonically increasing with respect to the increase of the correlation value deviation (ΔMk, ΔFb, ΔSv) from zero to the predetermined value (mk2, fb4) and becoming constant with respect to the increase of the correlation value deviation (ΔMk, ΔFb, ΔSv) from the predetermined value (mk2, fb4). It is preferred that the predetermined value (mk2, fb4) be a value corresponding to the fluctuation range of the torque ripple of the electric motor (MTR). Then, based on the feedback energization amount (Ipt) and the first compensation energization amount (Ibt), the target energization amount (Imt) is calculated.

In this case, it is preferred that an incremental gradient (Kpq, Kpp) of the feedback energization amount (Ipt) with respect to the increase of the correlation value deviation (ΔMk, ΔFb, ΔSv) be set to a value smaller than an incremental gradient (Kc) corresponding to an ultimate sensitivity of a feedback control system based on the correlation value deviation (ΔMk, ΔFb, ΔSv). It is preferred that an incremental gradient (Kpb, Kpc) of the first compensation energization amount (Ibt) with respect to the increase of the correlation value deviation (ΔMk, ΔFb, ΔSv) from zero to the predetermined value (mk2, fb4) be set to a value larger than the incremental gradient (Kc) corresponding to the ultimate sensitivity.

Alternatively, the present invention has a feature in that the control means (CTL) is configured as follows. Specifically, based on the operation amount (Bpa), the target correlation value (Mkt, Fbt, Svt) correlated with the target pressing force of the friction member (MSB) on the rotating member (KTB) is calculated. The difference between the target correlation value (Mkt, Fbt, Svt) and the actual correlation value (Mka, Fba, Sva) is calculated as the correlation value deviation (ΔMk, ΔFb, ΔSv). Based on the correlation value deviation (ΔMk, ΔFb, ΔSv), a first compensation energization amount (Ibt+Ipt) is calculated, which is used for adjusting the target energization amount (Imt) to make the correlation value deviation (ΔMk, ΔFb, ΔSv) closer to zero and for compensating for the effects of the torque ripple of the electric motor (MTR). The first compensation energization amount (Ibt+Ipt) has a characteristic of monotonically increasing with a first incremental gradient (Kpe2, Kpd2) with respect to the increase of the correlation value deviation (ΔMk, ΔFb, ΔSv) from zero to the predetermined value (mk2, fb4) and monotonically increasing with a second incremental gradient (Kpe1, Kpd1) smaller than the first incremental gradient (Kpe2, Kpd2) with respect to the increase of the correlation value deviation (ΔMk, ΔFb) from the predetermined value (mk2, fb4). It is preferred that the predetermined value (mk2, fb4) be a value corresponding to the fluctuation range of the torque ripple of the electric motor (MTR), Then, based on the first compensation energization amount (Ibt+Ipt), the target energization amount (Imt) is calculated.

Alternatively, when the control means (CTL) includes the wheel speed acquisition means (VWA) for acquiring the speed (Vwa) of the wheel (WHL), the present invention has a feature in that the control means (CTL) is configured as follows. Specifically, based on the speed (Vwa) of the wheel (WHL), the slip state quantity (Svw, dVw) indicating a slip state of the wheel is calculated. Based on the slip state quantity (Svw, dVw), the target correlation value (Mkt, Fbt, Svt) correlated with the target pressing force of the friction member (MSB) on the rotating member (KTB) is calculated. The difference between the target correlation value (Mkt, Fbt, Svt) and the actual correlation value (Mka, Fba, Sva) is calculated as the correlation value deviation (ΔMk, ΔFb, ΔSv). Based on the correlation value deviation (ΔMk, ΔFb, ΔSv), the first compensation energization amount (Ibt+Ipt) is calculated, which is used for adjusting the target energization amount (Imt) to make the correlation value deviation (ΔMk, ΔFb, ΔSv) closer to zero and for compensating for the effects of the torque ripple of the electric motor (MTR). The first compensation energization amount (Ibt+Ipt) has the characteristic of monotonically increasing with the first incremental gradient (Kpe2, Kpd2) with respect to the increase of the correlation value deviation (ΔMk, ΔFb, ΔSv) from zero to the predetermined value (mk2, fb4) and monotonically increasing with the second incremental gradient (Kpe1, Kpd1) smaller than the first incremental gradient (Kpe2, Kpd2) with respect to the increase of the correlation value deviation (ΔMk, ΔFb) from the predetermined value (mk2, fb4). It is preferred that the predetermined value (mk2, fb4) be a value corresponding to the fluctuation range of the torque ripple of the electric motor (MTR). Then, based on the first compensation energization amount (Ibt+Ipt), the target energization amount (Imt) is calculated.

In this case, it is preferred that the first incremental gradient (Kpe2, Kpd2) be set to a value larger than the incremental gradient (Kc) corresponding to the ultimate sensitivity of the feedback control system based on the correlation value deviation (ΔMk, ΔFb, ΔSv). It is preferred that the second incremental gradient (Kpe1, Kpd1) be set to a value smaller than the incremental gradient (Kc) corresponding to the ultimate sensitivity.

According to the configuration described above, when the correlation value deviation falls within the range corresponding to the fluctuation range of the torque ripple (that is, within a maximum width of the correlation value deviation which may be generated by the torque ripple), a control gain (incremental gradient of the energization amount with respect to the correlation value deviation) of the feedback control system based on the correlation value deviation can be set to a relatively large value. Therefore, the feedback control for instantaneously reducing the correlation value deviation to zero can be performed. On the other hand, when the correlation value deviation is out of the region corresponding to the fluctuation range of the torque ripple, the control gain can be set to a relatively small value which can be used in normal feedback control. Therefore, stability of the control system can be ensured. As described above, according to the present invention, the stability of the whole braking means can be ensured, and the feedback control follows even a slight correlation value deviation to appropriately compensate for the effect of the torque ripple.

In the brake control device, the actual correlation value acquisition means (FBA) can be configured to acquire, as the actual correlation value, the actual pressing force (Fba) which is a force for actually pressing the friction member (MSB) against the rotating member (KTB). The control means (CTL) can be configured to: calculate the target pressing force (Fbt), which is a target value of the force for pressing the friction member (MSB) against the rotating member (KTB), as the target correlation value, and use the pressing-force deviation (ΔFb), which is a difference between the target pressing force (Fbt) and the actual pressing force (Fba), as the correlation value deviation.

Further, in the brake control device, it is preferred that the control means (CTL) be configured to: prestore a calculation characteristic (CHf) which is set based on a torque fluctuation over a predefined range of a position of the electric motor (MTR); calculate a second compensation energization amount (Ift) for compensating for the effect of the torque ripple of the electric motor (MTR) based on an actual position (Mka) of the electric motor (MTR) and the calculation characteristic (CHf); and calculate the target energization amount (Imt) based on the second compensation energization amount (Ift).

According to the configuration described above, the calculation characteristic is set based on the current value for cancelling out the actually measured torque ripple of the electric motor. In this manner, the second compensation energization amount is calculated as a target value of the energization amount for cancelling out the torque ripple of the electric motor in a feedforward manner. As a result, the amount of increase of the output torque due to the torque ripple of the electric motor is reduced, whereas the amount of decrease thereof is increased. Thus, the torque ripple can be cancelled out in a feedforward manner. As a result, the effects of the torque ripple can be further appropriately compensated for.

In the case where the target energization amount (Imt) is calculated based on the second compensation energization amount (Ift) as described above, it is preferred that the control means (CTL) be configured to: calculate a speed (dMka) of the electric motor (MTR) based on the actual position (Mka) of the electric motor (MTR); calculate a delay time (Tph) for compensating for a phase difference between the torque ripple of the electric motor and the second compensation energization amount (Ift) based on the speed (dMka); and calculate the second compensation energization amount (Ift) based on the delay time (Tph).

In general, as the rotation speed of the electric motor becomes higher, the phase of the torque (torque ripple compensation torque) generated by the second compensation energization amount is delayed in time with respect to the actual torque ripple. According to the configuration described above, the phase is adjusted by using the delay time which is calculated based on the speed of the electric motor, thereby calculating the second compensation energization amount. Therefore, even when the rotation speed of the electric motor is high, the time delay of the torque ripple compensation torque by the second compensation energization amount with respect to the actual torque ripple is eliminated. As a result, the torque ripple can be appropriately compensated for.

Further, in the case where the target energization amount (Imt) is calculated based on the second compensation energization amount (Ift) as described above, it is preferred that the control means (CTL) be configured to: calculate the speed (dMka) of the electric motor (MTR) based on the actual position (Mka) of the electric motor (MTR); and calculate the second compensation energization amount (Ift) to be zero when the speed (dMka) is equal to or larger than a predetermined speed (dmk).

In general, insufficient control accuracy (resolution) of the braking torque due to the torque ripple of the electric motor does not become a severe problem when the electric motor is rotating at high speed. According to the configuration described above, when the electric motor is rotating at high speed, the feedforward control for compensating for the torque ripple is stopped. As a result, unnecessary execution of the above-mentioned control can be suppressed.

DESCRIPTION OF EMBODIMENTS

Now, a vehicle brake control device according to embodiments of the present invention is described with reference to the drawings.

<Overall Configuration of Vehicle Equipped with Vehicle Brake Control Device of the Present Invention>

Figure 1:
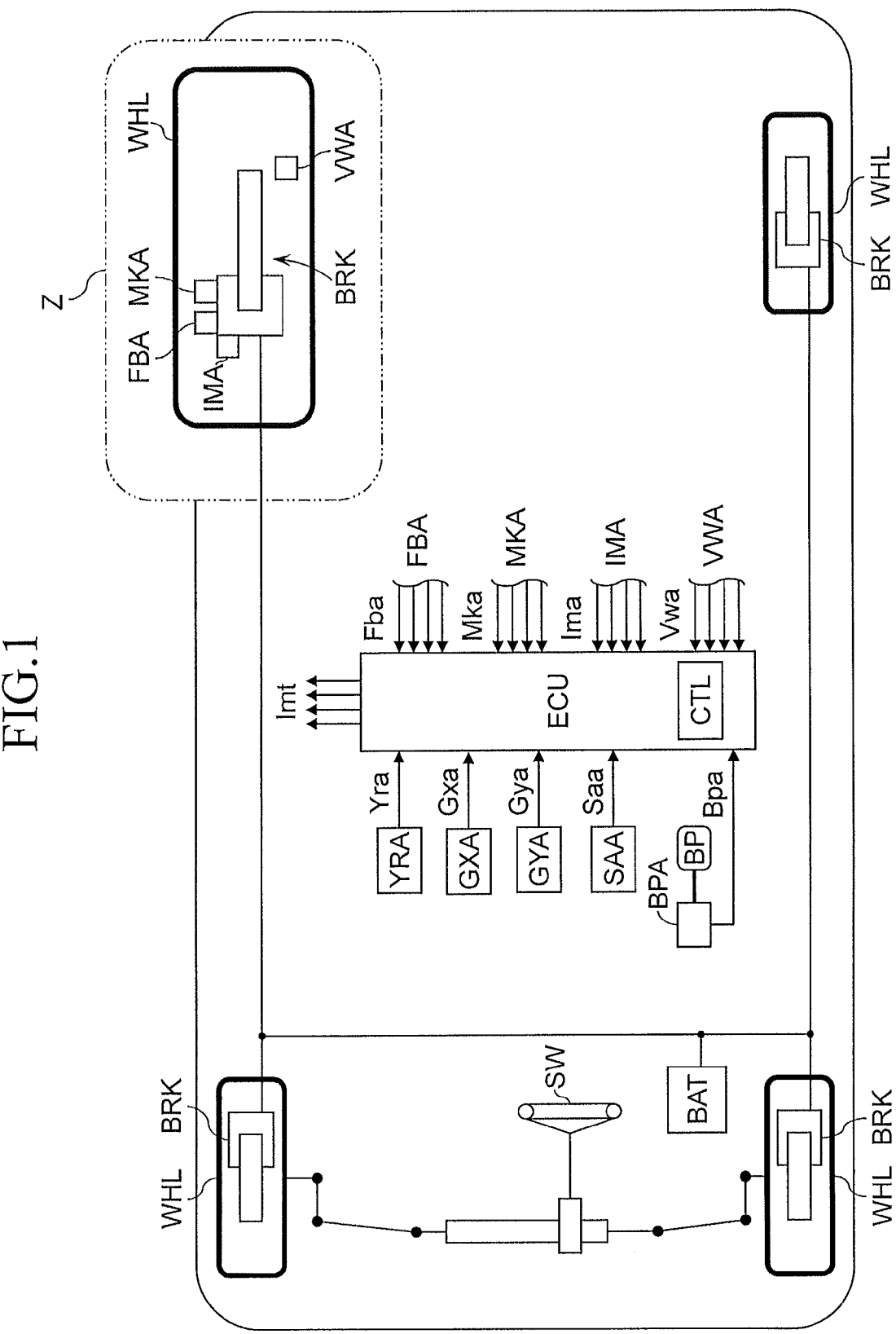
FIG. 1 is a schematic configuration diagram of a vehicle in which a brake control device according to embodiments of the present invention is mounted.

As illustrated in FIG. 1, this vehicle is equipped with a braking operation member (for example, brake pedal) BP that is used by a driver for decelerating the vehicle, braking means (brake actuator) BRK by which a braking torque of each wheel is adjusted to generate a braking force therefor, an electronic control unit ECU for controlling the BRK, and a battery BAT as a power source for supplying electric power to the BRK, the ECU, and the like.

In addition, this vehicle includes braking operation amount acquisition means (such as stroke sensor or leg-force sensor) BPA for detecting an operation amount Bpa of the BP, steering angle detection means SAA for detecting a steering angle Saa of a steering wheel SW operated by the driver, yaw rate detection means YRA for detecting a yaw rate Yra of the vehicle, longitudinal acceleration detection means GXA for detecting a vehicle longitudinal acceleration Gxa, lateral acceleration detection means GYA for detecting a vehicle lateral acceleration Gya, and wheel speed detection means VWA for detecting a rotation speed (wheel speed) Vwa of each wheel WHL.

The braking means BRK is equipped with an electric motor MTR (not shown) and the braking torque of the wheel WHL is controlled by the MTR. In addition, the BRK includes pressing force detection means (for example, axial force sensor) FBA for detecting a pressing force Fba of a friction member to press a rotating member, energization amount detection means (for example, current sensor) IMA for detecting an energization amount (for example, current value) Ima to the MTR, and position detection means (for example, rotation angle sensor) MKA for detecting the position (for example, rotation angle) Mka of the MTR.

The above-mentioned signals (such as Bpa) that are detected by the various detection means are subject to noise removal (reduction) filter (for example, low-pass filter) processing and then are supplied to the ECU. In the ECU, arithmetic processing for the brake control related to the present invention is executed. That is to say, control means CTL to be described later is programmed in the ECU, and a target energization amount (for example, target current value or target duty ratio) Imt for controlling the electric motor MTR is calculated based on the Bpa and the like. In addition, based on the Vwa, the Yra, and the like, in the ECU, arithmetic processing is executed for, for example, anti-skid control (ABS), traction control (TCS), and vehicle stabilization control (ESC) that are known.

<Configuration of Braking Means (Brake Actuator) BRK>

In the brake control device according to the present invention, the electric motor MTR generates and adjusts the braking torque of the wheel WHL.

Figure 2:
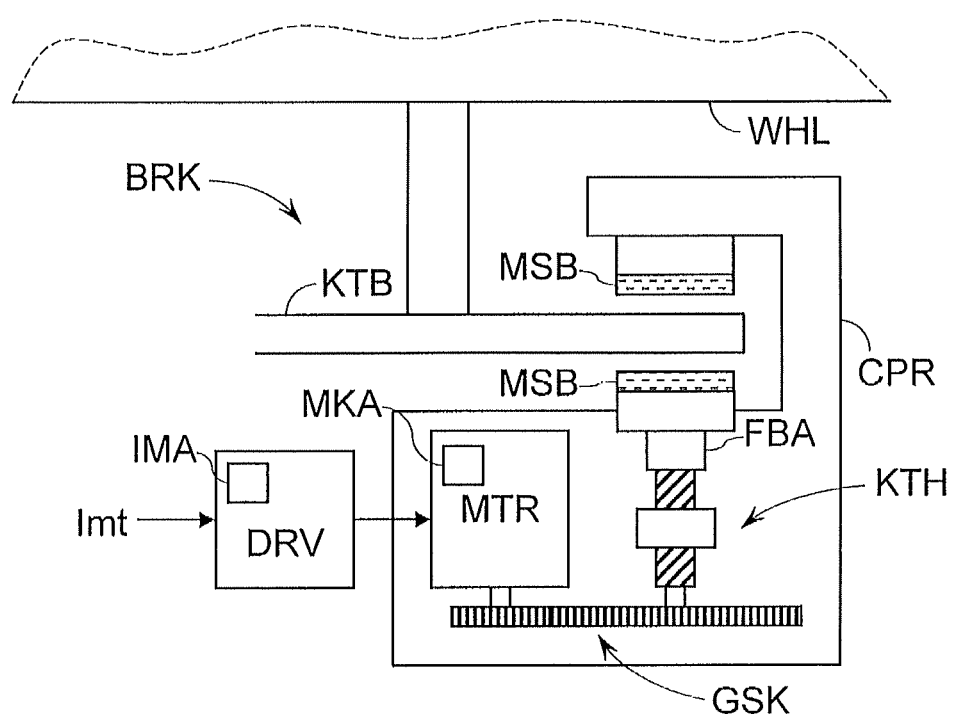
FIG. 2 is a diagram illustrating a configuration of braking means (brake actuator) (Z portion) illustrated in FIG. 1.

As illustrated in FIG. 2 that is an enlarged view of the Z portion of FIG. 1, the braking means BRK includes a brake caliper CPR, a rotating member KTB, a friction member MSB, the electric motor MTR, driving means DRV, a reducer GSK, a rotation/linear motion conversion mechanism KTH, the pressing-force acquisition means FBA, the position detection means MKA, and the energization amount acquisition means IMA.

Similarly to the known braking device, the brake actuator BRK includes the brake caliper CPR that is known and the friction members (for example, brake pads) MSB. The MSBs are pressed against the rotating member (for example, brake rotor) KTB that is known to cause frictional forces, thereby generating a braking torque at the wheel WHL.

In the driving means (driving circuit of the electric motor MTR) DRV, based on the target energization amount (target value) Imt, an energization amount (finally, current value) to the electric motor MTR is controlled. Specifically, in the driving means DRV, a bridge circuit that uses power transistors (for example, MOS-FETs) is formed, and the power transistors are driven based on the target energization amount Imt to control the output of the electric motor MTR.

The output (output torque) of the electric motor MTR is transmitted, by way of the reducer (for example, gear sets) GSK, to the rotation/linear motion conversion mechanism KTH. Then, the KTH converts a rotation motion into a linear motion, and the linear motion urges the friction members (brake pads) MSB onto the rotating member (brake disc) KTB. The KTB is fixed to the wheel WHL, and the friction between the MSB and the KTB generates and adjusts the braking torque at the wheel WHL. As the rotation/linear motion conversion mechanism KTH, a sliding screw (for example, trapezoidal screw) that uses "sliding" for power transmission (sliding transmission) or a ball screw that uses "rolling" for power transmission (rolling transmission) is available.

The motor driving circuit DRV includes the energization amount acquisition means (for example, current sensor) IMA for detecting the actual energization amount (for example, actual current flowing to the electric motor) Ima. In addition, the electric motor MTR is equipped with the position detection means (for example, angle sensor) MKA for detecting the position (for example, rotation angle) Mka of the MTR. Further, the pressing-force acquisition means (for example, force sensor) FBA is provided for acquiring (detecting) the force (actual pressing force) Fba with which the friction member MSB actually presses the rotating member KTB.

In FIG. 2, a so-called disc type braking device (disc brake) is illustrated as an exemplary configuration of the braking means BRK, but the braking means BRK may be in the form of a drum type braking device (drum brake). In the case of the drum brake, the friction member MSB is a brake shoe and the rotating member KTB is a brake drum. Similarly, the force with which the brake shoe presses the brake drum (pressing force) is controlled by the electric motor MTR. As the electric motor MTR, a device that generates a torque by rotation motion is exemplified, but a linear motor is available that generates a force by linear motion.

<Overall Configuration of Control Means CTL>

Figure 3:
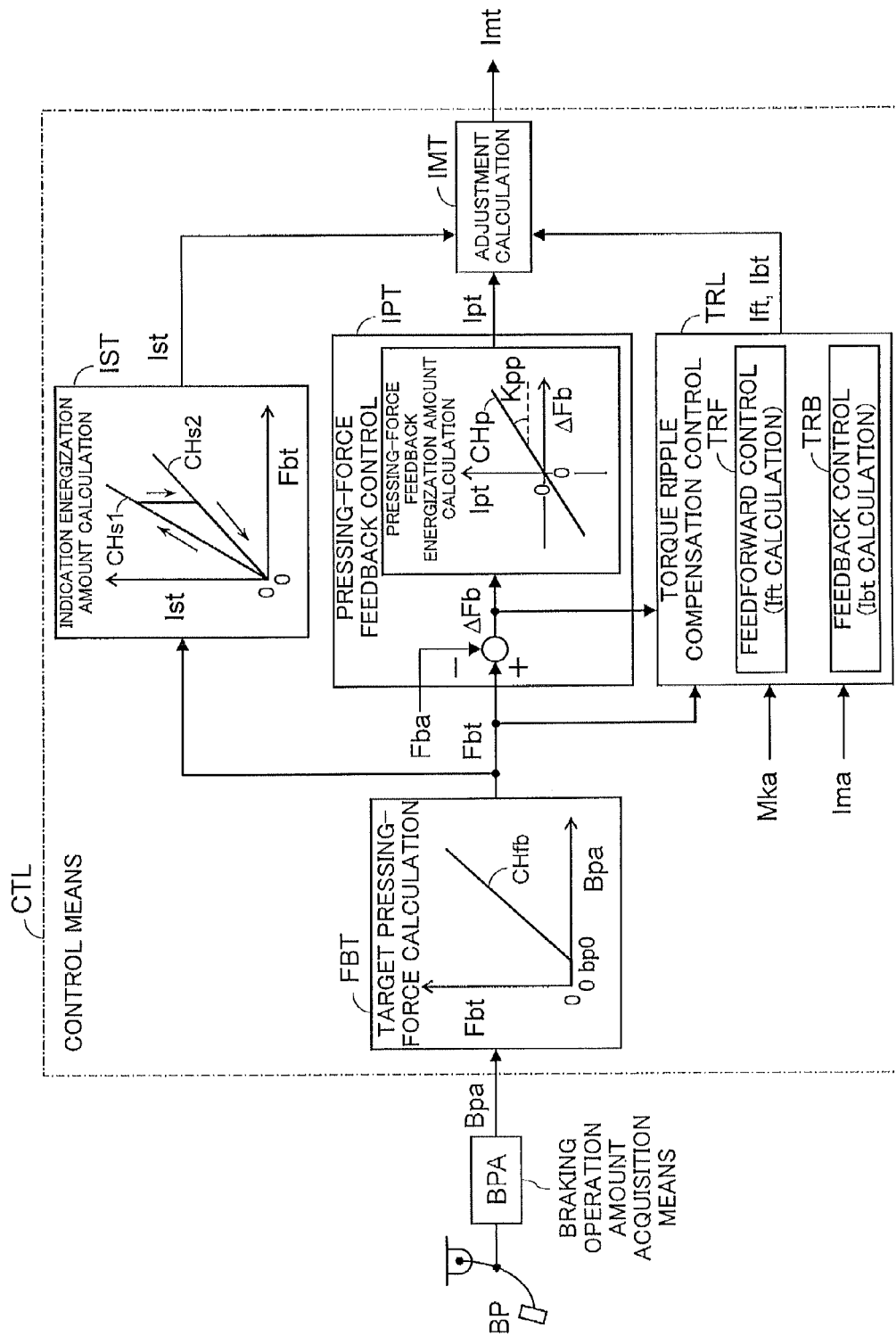
FIG. 3 is a functional block diagram illustrating control means (brake controller) illustrated in FIG. 1.

As illustrated in FIG. 3, the control means CTL that is illustrated in FIG. 1 includes a target pressing-force calculation block FBT, an indication energization amount calculation block IST, a pressing-force feedback control block IPT, a torque ripple compensation control block TRL, and an energization amount adjustment calculation block IMT. The control means CTL is programmed in the electronic control unit ECU.

An operation amount Bpa of the braking operation member BP (for example, brake pedal) is acquired by the braking operation amount acquisition means BPA. The operation amount of the braking operation member (braking operation amount) Bpa is calculated based on at least one of an operation force of the braking operation member (for example, brake pedal force) operated by the driver and a displacement amount (for example, brake pedal stroke) thereof. The Bpa is subject to calculation processing using a low-pass filter or the like for noise component removal (reduction).

In the target pressing-force calculation block FBT, a preset target pressing force calculation characteristic (calculation map) CHfb is used for calculating a target pressing force Fbt based on the operation amount Bpa. The "pressing force" is a force with which the friction member (for example, brake pad) MSB presses the rotating member (for example, brake disc) KTB in the braking means (brake actuator) BRK. The target pressing force Fbt is a target value of the pressing force.

The indication energization amount calculation block IST calculates, by using preset calculation maps CHs1 and CHs2, an indication energization amount Ist based on the target pressing force Fbt. The indication energization amount Ist is a target value of the energization amount to the electric motor MTR, which is used for driving the electric motor MTR of the braking means BRK to achieve the target pressing force Fbt. Taking into consideration of the hysteresis of the brake actuator, the calculation map (calculation characteristics for indication energization amount) has the two characteristics CHs1 and CHs2. The characteristic (first indication energization amount calculation characteristic) CHs1 is for coping with an increase of the pressing force, while the characteristic (second indication energization amount calculation characteristic) CHs2 is for coping with a decrease of the pressing force. For this reason, the characteristic CHs1 is set so as to output a relatively large indication energization amount Ist as compared to the characteristic CHs2.

As used herein, the energization amount is a state amount (variable) for controlling an output torque of the electric motor MTR. Due to the fact that the torque output from the electric motor MTR is almost in proportion to a current supplied thereto, a current target value of the electric motor is available as a target value of the energization amount. In addition, when a voltage supplied to the electric motor MTR is increased, the resultant current is increased, and hence a supply voltage value is available as the target energization amount. Moreover, a duty ratio in pulse width modulation (PWM) makes it possible to adjust the supply voltage value, and hence this duty ratio is available as the energization amount.

In the pressing force feedback control block IPT, a pressing force feedback energization amount Ipt is calculated based on the target pressing force (target value) Fbt and the actual pressing force (actual value) Fba. The indication energization amount Ist is calculated as a value that corresponds to the target pressing force Fbt, but an efficiency variation of the brake actuator may cause an error between the target pressing force Fbt and the actual pressing force Fba. The pressing force feedback energization amount Ipt is calculated and determined to decrease the above-mentioned error based on a deviation (pressing force deviation) ΔFb between the target pressing force Fbt and the actual pressing force Fba and a calculation characteristic (calculation map) CHp. In other words, in the IPT, feedback control (for example, PID control) is performed based on the Ipt calculated from the deviation ΔFb. On the calculation characteristic CHp, the Ipt is set so as to monotonically increase with respect to an increase of the ΔFb. An incremental gradient of the Ipt with respect to the increase of ΔFb on the CHp corresponds to a control gain (proportional gain) Kpp of the pressing-force feedback control. The Kpp is set to a value so that actuation of the BRK (output of the pressing force) is stabilized (does not become vibrational). The Fba is acquired by the pressing-force acquisition means FBA.

In the torque ripple compensation control block TRL, the effects of a torque ripple of the electric motor MTR (pulsation of an output torque of the electric motor due to a density distribution of a magnetic flux) is compensated for. The torque ripple compensation control block TRL includes a feedforward control block TRF and a feedback control block TRB to calculate target values Ift and Ibt of the energization amount for compensating for the effects of the torque ripple of the electric motor. In the feedforward control block TRF, the target value Ift of the energization amount is calculated by feedforward control (FF). In the feedback control block TRB, the target value Ibt of the energization amount is calculated by feedback control (FB control).

Then, in the energization amount adjustment calculation block IMT, the indication energization amount Ist is adjusted by the pressing-force feedback energization amount Ipt and the torque ripple compensation amount Ift (FF control), or Ibt (FB control), thereby calculating the target energization amount Imt. Specifically, the indication energization amount Ist is added with the pressing force feedback energization amount Ipt and the torque ripple compensation amount Ift or Ibt, and the resultant sum is calculated as the target energization amount Imt. The target energization amount Imt is a final target value of the energization amount for controlling the output of the electric motor MTR.

<Feedforward Control Block TRF of One Embodiment>

Figure 4:
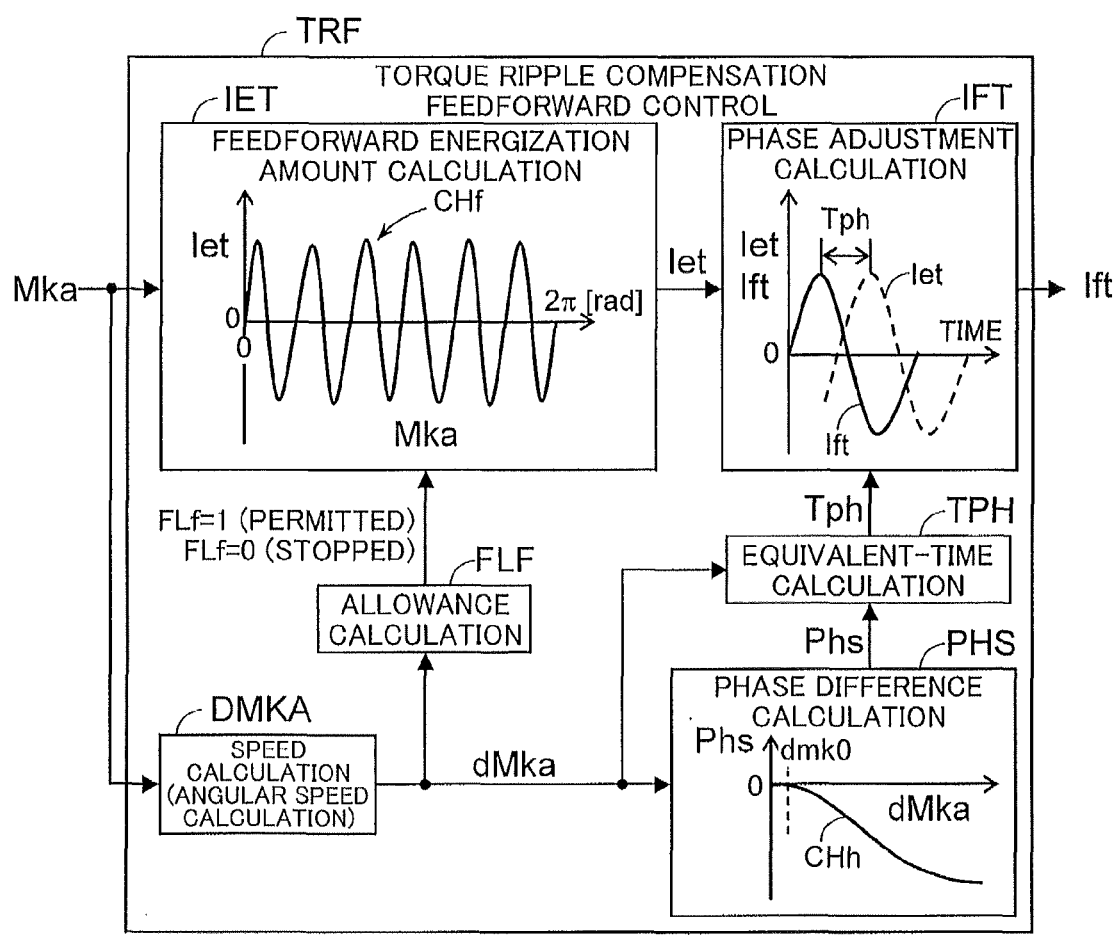
FIG. 4 is a functional block diagram illustrating a feedforward control block TRF illustrated in FIG. 3 according to one embodiment of the present invention.

FIG. 4 is a functional block diagram illustrating an embodiment of the feedforward control block TRF in the torque ripple compensation. The TRF includes a torque ripple compensation feedforward energization amount calculation block IET, a speed calculation block DMKA for the electric motor, a phase difference calculation block PHS, an equivalent-time calculation block TPH, and a phase-adjustment calculation block IFT.

In the feedforward energization amount calculation block IET, an energization amount target value (feedforward energization amount) Ift for cancelling out the above-mentioned torque ripple is calculated by using a calculation characteristic (calculation map) CHf which is set based on the output fluctuation (torque ripple) of the electric motor over a predefined range of the position of the electric motor (for example, one revolution of the electric motor) based on the actual position Mka of the electric motor MTR. The calculation map CHf can be set based on a current value for cancelling out a torque ripple which is measured by experimentally moving (rotating) the MTR at a low speed. When the brake actuator BRK is mounted in the vehicle or the device is started, the calculation map is set based on the relationship between the actual position Mka of the electric motor, the actual energization amount Ima to the electric motor, and the actual pressing force Fba. The Iet is an energization amount (target value) for cancelling out the torque ripple of the electric motor.

In the speed calculation block DMKA, an actual speed (rotation angular speed) dMka is calculated based on the actual position (rotation angle) Mka of the electric motor MTR. Specifically, the Mka is differentiated to calculate the dMka.

In the phase difference calculation block PHS, a phase difference Phs is calculated based on the actual speed dMka of the MTR and the calculation characteristic (calculation map) CHh. In the control system, when an input frequency becomes higher, a phase difference (phase lag) is generated between the input and the output due to a time period required for the calculation and communication and a response of the actuator. Specifically, the torque ripple is cancelled out to be reduced based on the Iet calculated from the Mka. However, when the phase difference is generated between the torque generated as a result of the Iet and the actually generated torque ripple, the torque ripple is not appropriately cancelled out. The number of torque ripples for one revolution of the electric motor is known. Therefore, the phase difference (phase difference represented by an angle for one period of the torque ripple) Phs between the Iet (that is, Mka) and the actual torque ripple is calculated based on the dMka and the CHh. On the calculation characteristic CHh, when the dMka is equal to or larger than "0" and is smaller than a predetermined value dmk0, the Phs is set to "0". When the dMka is equal to or larger than the predetermined value dmk0, the Phs is calculated so as to decrease from "0" (so as to increase the phase lag) as the dMka becomes larger (as the input of the Mka has a higher frequency).

In the equivalent-time calculation block TPH, a delay time Tph is calculated based on the phase difference Phs and the actual speed dMka of the electric motor. The delay time Tph is a time period required for actually generating the torque for canceling out the torque ripple (torque ripple compensation torque) from the time of calculation of the target value Iet based on the actual position Mka of the electric motor. In other words, the delay time Tph is a time period required for allowing the Mka and the torque ripple compensation torque to coincide with each other in terms of time. The phase difference Phs represented by the angle for one period of the torque ripple is converted into the delay time Tph based on the dMka.

In the phase-adjustment calculation block IFT, the Iet is adjusted by the Tph in terms of time to calculate the final feedforward energization amount Ift so as to eliminate the above-mentioned phase difference. For example, when the above-mentioned phase difference (phase difference between the Iet and the torque generated as a result) is delayed by $\pi$ [rad] (180°), the torque ripple is undesirably increased due to the feedforward energization amount Iet before the adjustment. On the other hand, in the IFT, the above-mentioned phase difference can be eliminated by the delay time Tph. Therefore, the torque for suppressing the torque ripple (torque ripple suppressing torque) and the actual torque ripple come into synchronization with each other. As a result, the torque ripple can be reliably reduced.

The Ift is an energization amount (target value) for cancelling out the torque ripple of the electric motor. The target energization amount Imt is adjusted based on the Ift. Specifically, the energization amount (target value) Ift having the opposite phase to that of the energization amount corresponding to the torque ripple is added to the Imt, As a result, the effects of the torque ripple can be reduced.

Insufficient accuracy of the braking torque due to the above-mentioned torque ripple does not become a big problem when the electric motor is moving at high speed (is rotating at high speed). Therefore, an allowance calculation block FLF is provided. When the dMka is equal to or higher than a predetermined speed dmk, the compensation for the torque ripple is stopped (Ift=0). Only when the dMka is lower than the predetermined speed dmk, the Iet (that is, Ift) can be calculated. Specifically, when dMka<dmk holds, a control flag FLf=1, which indicates "control permission" is transmitted from the FLF to the IET. Then, the calculated Iet is output from the IET. On the other hand, when dMka≥dmk holds, the FLf=0, which indicates "control stop" is transmitted to calculate: Iet=0.

Only when the electric motor MTR is driven at a low speed, the compensation for the effects of the torque ripple is required in some cases. In such a case, the above-mentioned phase difference (time delay in phase) is not generated. Therefore, the PHS, the TPH, and the IFT are omitted, and the Ift can be calculated based on the Mka.

<Feedback Control Block TRB of First Embodiment>

Figure 5:
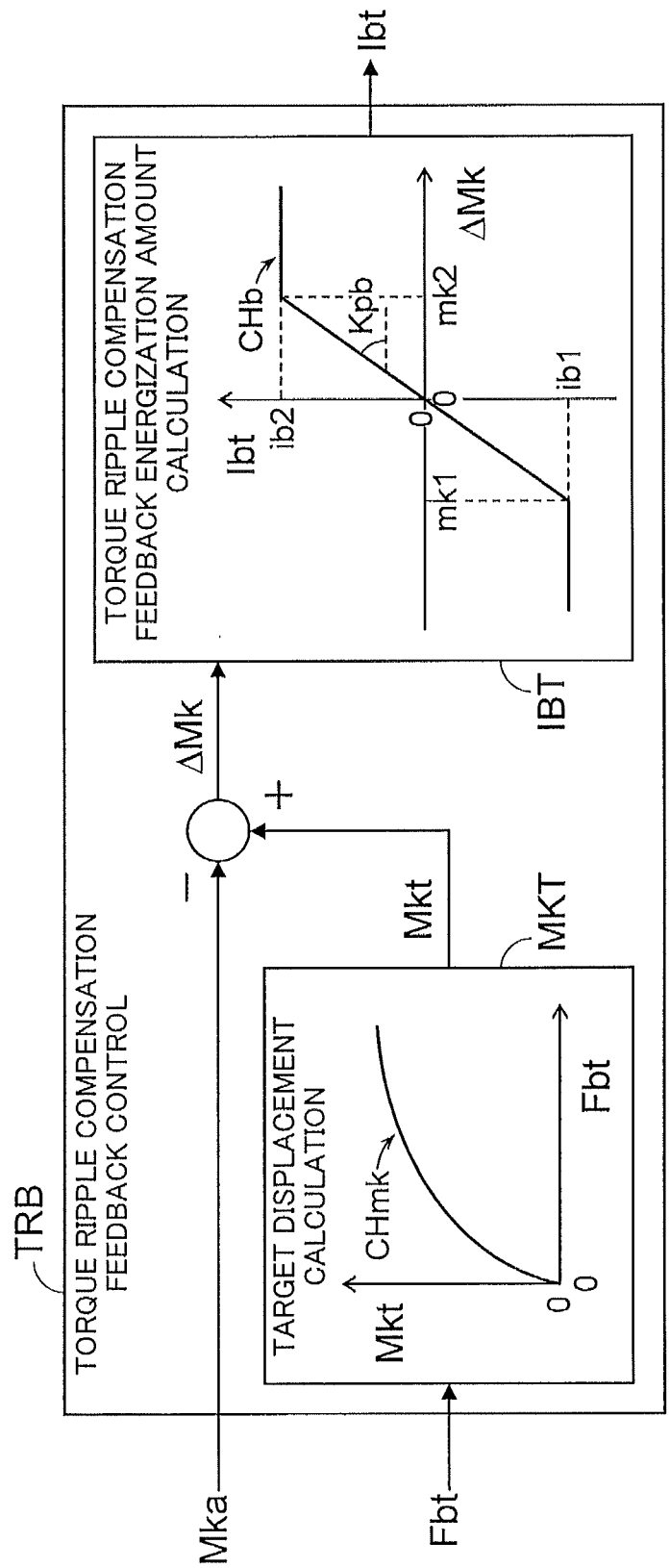
FIG. 5 is a functional block diagram illustrating a feedback control block TRB illustrated in FIG. 3 according to a first embodiment of the present invention.

FIG. 5 is a functional block diagram illustrating the torque ripple compensation feedback control block TRB according to a first embodiment of the present invention. The TRB includes a target-position calculation block MKT, a deviation calculation block, and a torque ripple compensation feedback energization amount calculation block IBT.

In the MKT, a target position (for example, a target rotation angle) Mkt of the electric motor MTR is calculated based on the target pressing force Fbt and a calculation characteristic (calculation map) CHmk. In the deviation calculation block, the actual position (for example, the rotation angle) Mka of the electric motor is subtracted from the Mkt to calculate a deviation ΔMk (=Mkt−Mka) between the target value and the actual value.

In the IBT, the feedback energization amount Ibt for compensating for the torque ripple is calculated based on the deviation (positional deviation) ΔMk at the position of the MTR and a calculation characteristic (calculation map) CHb. On the characteristic CHb, when the ΔMk is smaller than a first predetermined deviation (predetermined value) mk1 (<0), a first predetermined energization amount (predetermined value) ib1 (<0) is calculated as the Ibt. When the ΔMk is equal to or larger than the first predetermined deviation (predetermined value) mk1 and is smaller than a second predetermined deviation (predetermined value) mk2 (>0), the Ibt is calculated so as to monotonically increase from the ib1 through the origin O to ib2 as the ΔMk increases. When the ΔMk is equal to or larger than the second predetermined deviation (predetermined value) mk2, the second predetermined energization amount (predetermined value) ib2 (>0) is calculated as the Ibt.

On the calculation map CHb, an incremental gradient of the Ibt with respect to the increase of ΔMk corresponds to the feedback control gain (proportional gain in the PID control) Kpb for suppressing the effects of the torque ripple. Then, the control gain Kpb is set to a value which is relatively larger than that in normal feedback control (stable control which suppresses a vibration of the output fluctuation), and therefore the control responds sensitively to the torque ripple. Therefore, the effects of the torque ripple can be instantaneously compensated for.

Figure 11:
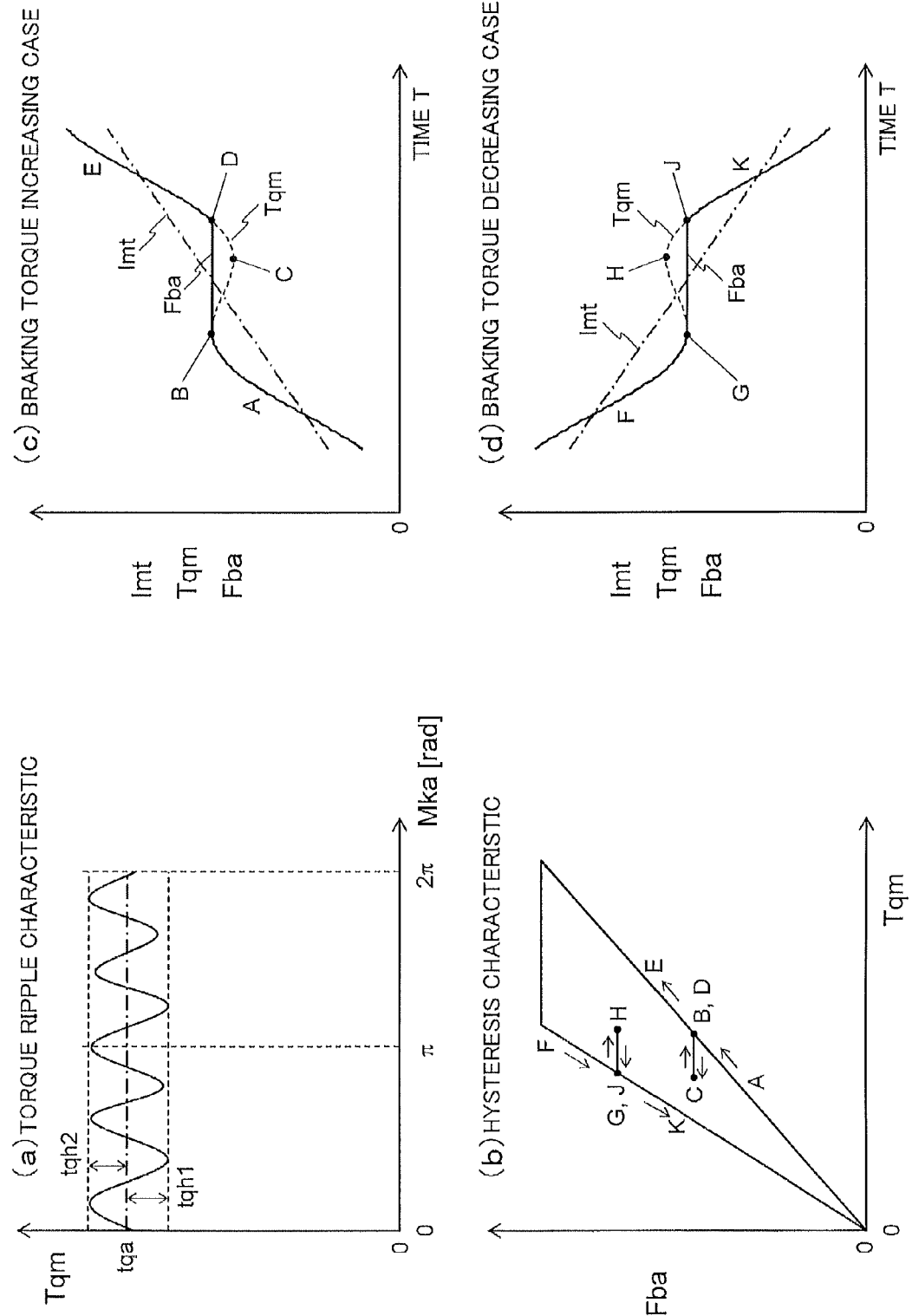
FIG. 11 are graphs showing a conventional problem due to a torque ripple.

In consideration of stiffness (spring constant) of the whole BRK, the position of the electric motor is correlated with the pressing force of the MSB and also is correlated with the force (torque) output by the electric motor. Therefore, the predetermined values mk1 and mk2 for the ΔMk on the characteristic CHb respectively correspond to torque fluctuation ranges tqh1 and tqh2 in FIG. 11(a). For example, when the braking torque is to be increased, an insufficient amount (positional deviation ΔMk) of the actual position with respect to the target position corresponds to the tqh1 due to the torque ripple (which is a torque difference from a median (mean value) tqa of the torque ripples to a minimum value thereof, and therefore is about ½ of the torque fluctuation range). Therefore, in order to compensate for an output drop of the tqh1, when ΔMk≥mk2 (>0) holds, the Ibt is calculated as: Ibt=ib2 (>0, constant value). Similarly, when the braking torque is to be reduced, an excessive amount (positional deviation ΔMk) of the actual position with respect to the target position corresponds to the tqh2 due to the torque ripple (which is a torque difference from the median (mean value) tqa of the torque ripples to a maximum value thereof, and is therefore about ½ of the torque fluctuation range). Therefore, in order to compensate for an output excess of the tqh2, when ΔMk<mk1 (<0) holds, the Ibt is calculated as: Ibt=ib1 (<0, constant value). Specifically, the predetermined values ib1 and ib2 are set as minimum necessary energization amounts which can cancel out the effects of the torque ripple.

The control gain (gradient of the Ibt with respect to the ΔMk) Kpb is set to a relatively large value. Therefore, an output of the control system becomes vibrational. However, the control range is limited to a region corresponding to the torque ripple (region from mk1 to mk2). Outside of the region (ΔMk≤mk1, ΔMk≥mk2), the control gain is set to "0". As a result, the Ibt is maintained to a constant value (ib1 or ib2). The above-mentioned control range corresponds to a maximum range of the ΔMt which may be generated by the torque fluctuation due to the torque ripple. Therefore, the stability of the whole device can be ensured, and the feedback control can follow even a slight deviation to appropriately compensate for the effects of the torque ripple.

In the above-mentioned adjustment compensation block IMT (see FIG. 3), the Imt is adjusted based on the Ibt. Specifically, the Ibt is added to calculate the Imt. When the output torque decreases due to the torque ripple, the Imt is increased. When the output torque increases due to the torque ripple, the Imt is reduced. In this manner, the effects of the torque ripple can be compensated for.

In the above-mentioned pressing-force feedback control block IPT (see FIG. 3), the feedback control is basically performed based on the deviation (pressing-force deviation) ΔFb between the target pressing force Fbt and the actual pressing force Fba so that the ΔFb becomes closer to zero. However, the control gain (inclination of the Fbt with respect to the ΔFb on the calculation characteristic CHp) Kpp is set in consideration of the stability of the control system (performance of approaching a steady state (target value) with no generated output vibration or with a quickly attenuated output vibration). Therefore, it is difficult to follow a slight torque fluctuation such as the torque ripple of the electric motor. Further, as described referring to FIG. 11, when overshoot occurs in the pressing force, the energization amount is required to be reduced excessively once to reduce the pressing force due to the hysteresis described above. Therefore, in the IPT, the control gain (for example, the proportional gain in the PID control, which is an inclination of the Ibt with respect to the ΔMt on the calculation characteristic CHb) Kpb is set to a relatively large value within the range of the position corresponding to the fluctuation range of the torque ripple (from mkt to mk2). The feedback control based on the Ibt responds sensitively only to a torque ripple component of the pressing force. Therefore, the slight torque fluctuation such as the torque ripple can be coped with. In addition, a corresponding range of the pressing-force feedback control is limited. Therefore, the stability of control in the whole system can be maintained.

<Feedback Control Block TRB of Second Embodiment>

Figure 6:
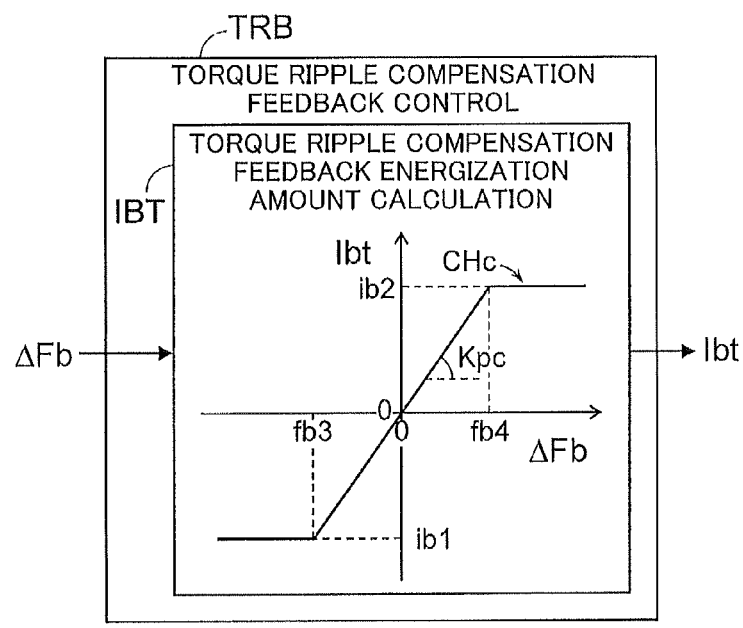
FIG. 6 is a functional block diagram illustrating the feedback control block TRB illustrated in FIG. 3 according to a second embodiment of the present invention.

FIG. 6 is a functional block diagram illustrating the torque ripple compensation feedback control block TRB according to a second embodiment of the present invention. The TRB includes the torque ripple compensation feedback energization amount calculation block IBT. The feedback energization amount Ibt for compensating for the torque ripple is calculated based on the pressing-force deviation ΔFb. The feedback energization amount Ibt is calculated based on the pressing-force deviation ΔFb which is calculated by subtracting the actual pressing force Fba from the target pressing force Fbt and a calculation characteristic (calculation map) CHc.

On the characteristic CHc, when the ΔFb is smaller than a third predetermined deviation (predetermined value) fb3 (<0), the first predetermined energization amount (predetermined value) ib1 (<0) is calculated as the Ibt. When the ΔFb is equal to or larger than the third predetermined deviation (predetermined value) fb3 and is smaller than a fourth predetermined deviation (predetermined value) fb4 (>0), the Ibt is calculated so as to monotonically increase from the ib1 through the origin O to the ib2 as the ΔFb increases. When the ΔFb is equal to or larger than the fourth predetermined deviation (predetermined value) fb4, the second predetermined energization amount (predetermined value) ib2 (>0) is calculated as the Ibt.

The force of each MSB for pressing the KTB (pressing force Fba) is correlated with the force output from the electric motor (torque). Therefore, the predetermined values fb3 and fb4 for the ΔFb on the characteristic CHc respectively correspond to the torques tqh1 and tqh2 in FIG. 11(a). For example, when the braking torque is to be increased, an insufficient amount (pressing force deviation ΔFb) of the actual pressing force with respect to the target pressing force corresponds to the tqh1 due to the torque ripple (which is a torque change from a median tqa of the torque ripples to the minimum value). Therefore, in order to compensate for an output drop of the tqh1, when ΔFb≥fb4 (>0) holds, the Ibt is calculated as: Ibt=ib2 (>0, constant value). Similarly, when the braking torque is to be reduced, an excessive amount (pressing force deviation ΔFb) of the actual pressing force with respect to the target pressing force corresponds to the tqh2 due to the torque ripple (which is a torque change from the median tqa of the torque ripples to the maximum value). Therefore, in order to compensate for an output excess of the tqh2, when ΔFb<fb3 (<0) holds, the Ibt is calculated as: Ibt=ib1 (<0, constant value). Specifically, the predetermined values ib1 and ib2 are set as the minimum necessary energization amounts which can cancel out the effects of the torque ripple.

In the above-mentioned adjustment calculation block IMT (see FIG. 3), the Imt is adjusted based on the V. Specifically, the Ibt is added to calculate the Imt. When the output torque decreases due to the torque ripple, the Imt is increased. When the output torque increases, the Imt is decreased. In this manner, the effects of the torque ripple can be compensated for.

Similarly to the first embodiment described above, on the calculation map CHc, an incremental gradient of the Ibt with respect to the increase of ΔFb corresponds to the feedback control gain (proportional gain in the PID control) Kpc for suppressing the effects of the torque ripple. Then, the control gain Kpc is set to a value which is relatively larger than that in normal feedback control (stable control which suppresses a vibration of the output fluctuation). Moreover, the control range of the feedback control based on the ΔFb is limited to the region corresponding to the torque ripple (region from fb3 to fb4). Outside of the region (ΔFb≤fb3, ΔFb≥fb4), the control gain is set to "0" to maintain the Ibt to a constant value (ib1 or ib2). The above-mentioned control range corresponds to a maximum range of the ΔFb which may be generated by the torque fluctuation due to the torque ripple.

Therefore, the stability of the BRK can be ensured, and the feedback control can follow even a slight deviation to appropriately compensate for the effects of the torque ripple.

<Pressing-Force Feedback Control Block IPT and the Like of Another Embodiment>

Figure 7:
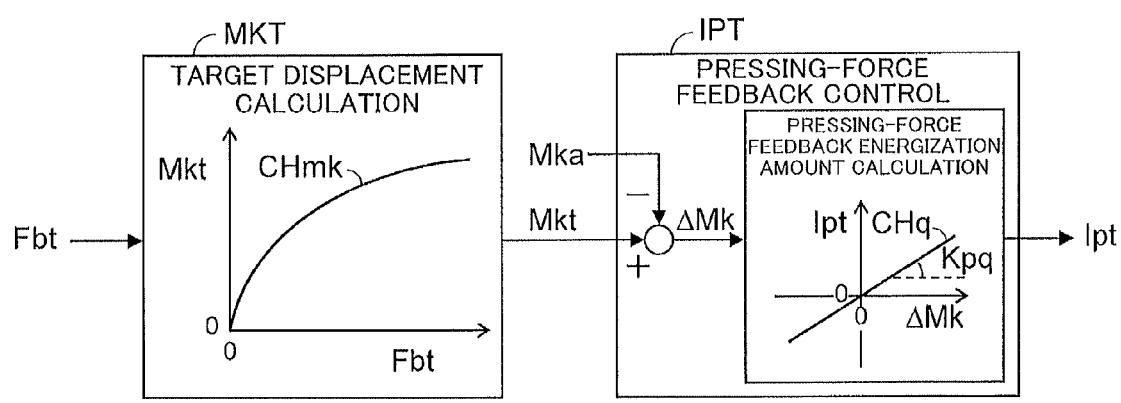
FIG. 7 is a functional block diagram illustrating a pressing-force feedback control block IPT illustrated in FIG. 3 according to another embodiment of the present invention.

Because the stiffness (spring constant) of the whole BRK including the brake caliper CPR and the like is known, once the position of the electric motor is acquired (detected), the actual pressing force Fba can be calculated. In the embodiment described referring to FIG. 3, the pressing-force feedback control is performed based on the deviation ΔFb between the target pressing force Fbt and the actual pressing force Fba in the pressing-force feedback control block IPT. On the other hand, in the IPT, the feedback control can be performed based on the deviation (positional deviation) ΔMk between the target position Mkt and the actual position Mka of the electric motor. FIG. 7 is a functional block diagram illustrating the case where the pressing-force feedback energization amount Ipt is calculated based on the deviation ΔMk of the position of the electric motor according to an embodiment of the present invention.

In the target-position calculation block MKT, the target position (for example, the target rotation angle) Mkt of the electric motor MTR is calculated based on the target pressing force Fbt and the calculation characteristic (calculation map) CHmk.

In the pressing-force feedback control block IPT, the pressing-force feedback energization amount Ipt is calculated based on the target position (target value) Mkt and the actual position (actual value) Mka. In the deviation calculation block, the actual position (for example, the rotation angle) Mka of the electric motor is subtracted from the Mkt to calculate the positional deviation ΔMk. The pressing-force feedback energization amount Ipt is calculated based on the positional deviation ΔMk and a calculation characteristic (calculation map) CHq. In other words, in the IPT, the feedback control (for example, the PID control) is performed based on the Ipt calculated from the ΔMk. On the calculation characteristic CHq, the Ipt is set so as to monotonically increase with respect to an increase of the ΔMk. The incremental gradient of the Ipt with respect to the increase of the ΔMk on the CHq corresponds to a control gain (proportional gain) Kpq of the pressing-force feedback control. The Kpq is set to a value at which the actuation of the BRK (output of the pressing force) is stabilized (does not become vibrational). The Mka is acquired by the position acquisition means MKA.

Similarly to the embodiment based on the ΔFb, which has been described referring to FIG. 3, the target energization amount Imt is calculated based on the pressing-force feedback energization amount Ipt which is output from the IPT.

<Feedback Control Block TRB of Third Embodiment>

Figure 8:
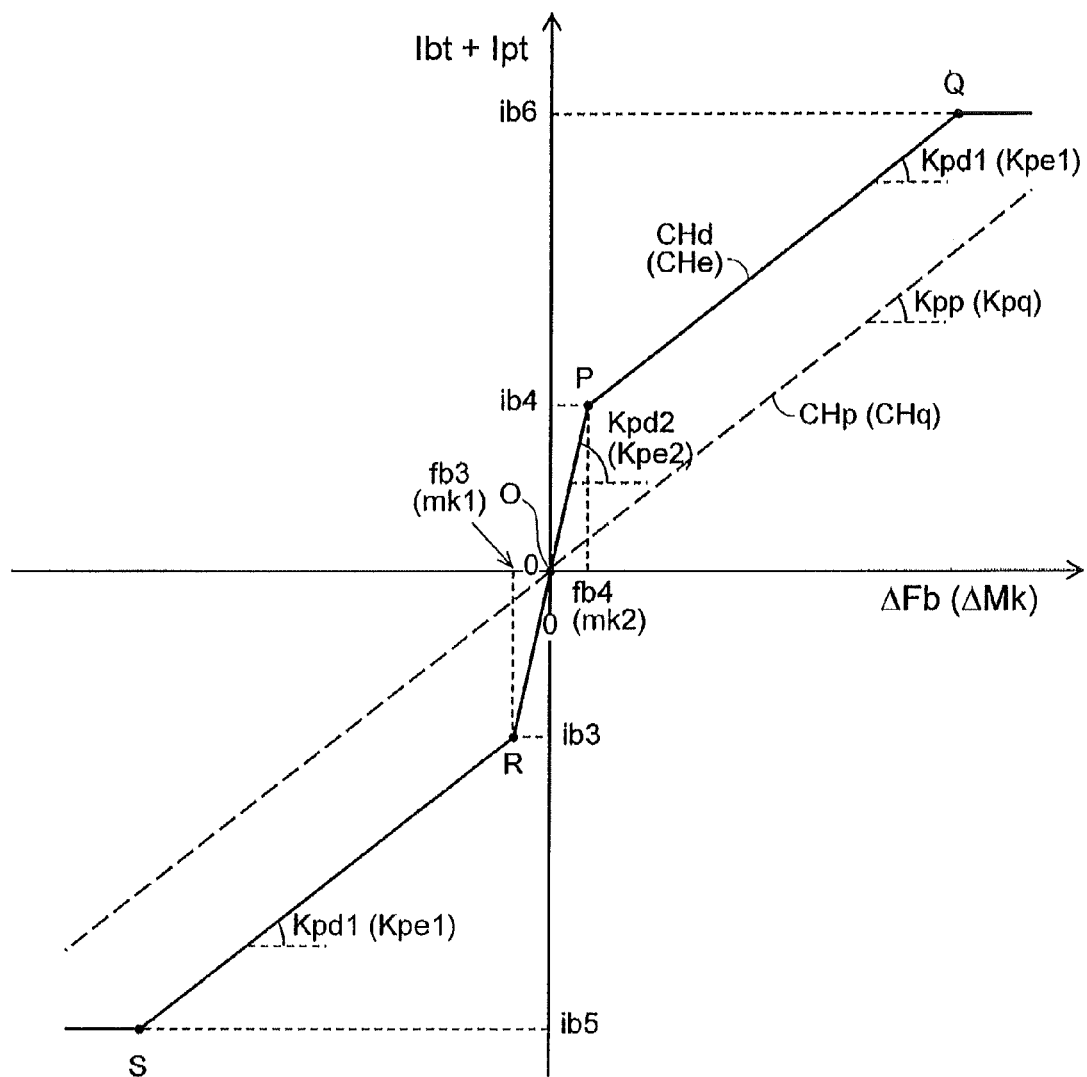
FIG. 8 is a functional block diagram illustrating the feedback control block TRB illustrated in FIG. 3 according to a third embodiment of the present invention.

FIG. 8 is a calculation characteristic (calculation map) illustrating the torque ripple compensation feedback control block TRB according to a third embodiment of the present invention. In the second embodiment (see FIG. 6) described above, similarly to the pressing-force feedback control block IPT (see FIG. 3), the Ibt is calculated based on the pressing-force deviation ΔFb. On the other hand, in the third embodiment, the IPT and the IBT are configured as a single calculation block where an error is suppressed based on the ΔFb and a calculation characteristic CHd with a torque ripple reduction function.

On the calculation characteristic (calculation map) CHd, the above-mentioned calculation characteristics CHp and CHc are added to be combined with each other. Specifically, on the characteristic CHd, when the ΔFb is smaller than the third predetermined deviation (predetermined value) fb3 (<0), the Ibt is set so as to monotonically increase with a relatively small incremental gradient (control gain Kpd1) to the third predetermined energization amount (predetermined value) ib3 (<0). When the ΔFb is equal to or larger than the third predetermined deviation (predetermined value) fb3 and is smaller than the fourth predetermined deviation (predetermined value) fb4 (>0), the Ibt is set so as to monotonically increase with a relatively large incremental gradient (control gain Kpd2) from the ib3 through the origin O to the ib4. When the ΔFb is equal to or larger than the fourth predetermined deviation (predetermined value) fb4, the Ibt is set so as to monotonically increase, as the ΔFb increases, with a relatively small incremental gradient (control gain Kpd1) from the fourth predetermined energization amount (predetermined value) ib4 (>0). On the calculation characteristic CHd, A range of the predetermined values fb3 to fb4 of the ΔFb correspond to the region of the torque ripple compensation feedback control. The control gain Kpd1 corresponds to the control gain Kpp on the calculation characteristic CHp. For the calculation characteristic CHd, a lower limit value ib5 and an upper limit value ib6 of the energization amount (target value) can be set.

Similarly to the TRB of each of the embodiments described above, also in the TRB of the third embodiment, on the calculation map CHd, in the region corresponding to the torque ripple (in the range where the ΔFb is from fb3 to fb4), the control gain (inclination of (Ipt+Ibt) with respect to the ΔFb) Kpd2 is set to a relatively large value. Therefore, the feedback control for instantaneously reducing the deviation to zero can be executed. Moreover, outside of the torque ripple region, the control gain Kpd1 is set to a relatively small value with which the control gain is used for normal feedback control. As a result, the stability of the control system can be ensured. By setting the control gain indicated on the calculation map CHd, the stability of the whole BRK can be ensured, and the feedback control can follow even a slight deviation to appropriately compensate for the effects of the torque ripple.

Similarly, the pressing-force feedback control block IPT (see FIG. 7) and the torque ripple compensation feedback energization amount calculation block IBT (see FIG. 5) can be configured as a single calculation block where an error is suppressed based on the ΔMk and a calculation characteristic CHe with the torque ripple reduction effect.

On the calculation characteristic (calculation map) CHe, the above-mentioned calculation characteristics CHq and CHb are added to be combined with each other. Specifically, on the characteristic CHe, when the ΔMk is smaller than the first predetermined deviation (predetermined value) mkt (<0), the Ibt is set so as to monotonically increase with a relatively small incremental gradient (control gain Kpe1) to the first predetermined energization amount (predetermined value) ib3 (<0). When the ΔMk is equal to or larger than the first predetermined deviation (predetermined value) mk1 and is smaller than the second predetermined deviation (predetermined value) mk2 (>0), the Ibt is set so as to monotonically increase, as the ΔMk increases, with a relatively large incremental gradient (control gain Kpe2) from the ib3 through the origin O to the ib4. When the ΔMk is equal to or larger than the second predetermined deviation (predetermined value) mk2, the Ibt is set so as to monotonically increase with a relatively small incremental gradient (control gain Kpe1) from the second predetermined energization amount (predetermined value) ib4 (>0). On the calculation characteristic CHe, the predetermined values mk1 to mk2 of the ΔMk correspond to the region of the torque ripple compensation feedback control. The control gain Kpe1 corresponds to the control gain Kpq on the calculation characteristic CHq. For the calculation characteristic CHe, a lower limit value ib5 and an upper limit value ib6 of the energization amount (target value) can be set.

Similarly to the TRB of each of the embodiments described above, on the calculation map CHe, in the region corresponding to the torque ripple (in the region where the ΔMk is from mk1 to mk2), the control gain (inclination of (Ipt+Ibt) with respect to the ΔMk) Kpe2 is set to a relatively large value. Therefore, the feedback control for instantaneously reducing the deviation to zero can be executed. Moreover, outside of the torque ripple region, the control gain Kpe1 is set to a relatively small value with which the control gain is used for normal feedback control. As a result, the stability of the control system can be ensured. By setting the control gain indicated on the calculation map CHe, the stability of the whole BRK can be ensured, and the feedback control can follow even a slight deviation to appropriately compensate for the effects of the torque ripple.

Figure 9:
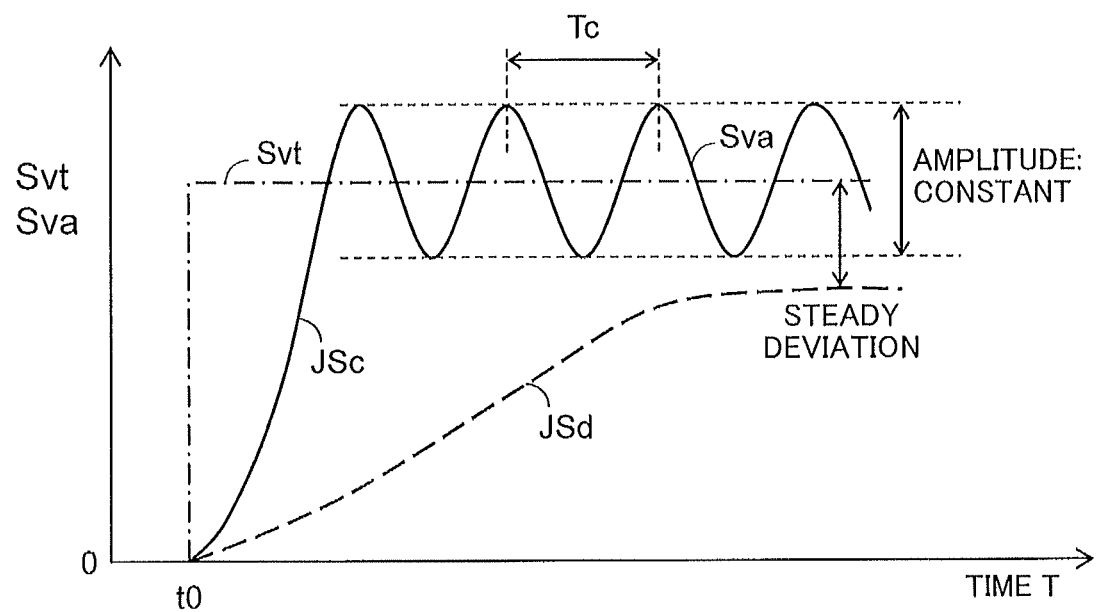
FIG. 9 is a diagram illustrating control gains in feedback control.

Hereinafter, referring to FIG. 9, differences between the control gains Kpb, Kpc, Kpd2, and Kpe2 in the torque ripple compensation control and the control gains Kpp, Kpq, Kpd1, and Kpe1 in the normal pressing-force feedback control are described in detail.

First, an ultimate sensitivity gain Kc is described. FIG. 9 shows a temporal change of an output (actual value) (actual correlation value described later) Sva which is subjected to the feedback control when a target value (target correlation value described later) Svt is step-input. When a gain for integral control and a gain for derivative control are each set to zero (specifically, in the case of the feedback control only with a proportional operation) in the feedback control (PID control), the output (actual value) Sva gradually transitions to a vibration state with an increase of the proportional gain Kp. Then, the output Sva reaches a state (persistent vibration state) in which vibrations at a constant amplitude are continued (time-series line JSc indicated by the solid line on the graph). The persistent vibration state (continuous constant-amplitude vibration state) is a stability limit of the control system (system). In other words, the stability limit is a boundary between a stable state in which the vibrations of the output are attenuated and an unstable state in which the vibrations increase. The control gain (proportional gain) at the stability limit is referred to as the ultimate sensitivity (also referred to as "ultimate sensitivity gain") Kc.

With an "ultimate sensitivity method" which is one of control-gain determining technologies in the feedback control, the control gain is calculated based on the "ultimate sensitivity (control gain at the stability limit) Kc" and a "vibration period Tc of the output". Specifically, the control gain can be set to a value which is 50 to 60% of the ultimate sensitivity Kc.

As the control gain (proportional gain) becomes smaller than the ultimate sensitivity Kc (stability limit), an attenuation rate of the output vibrations increases to increase the degree of stability of the control system. On the contrary, as the control gain becomes larger, an increase rate of the output vibrations increases to increase the degree of instability of the control system. Moreover, when the control gain is small, the output vibration is not generated as indicated by a time-series line JSd. However, the deviation when the output reaches the steady state does not become zero (the output does not become equal to the target value). As a result, an offset (steady deviation) occurs.

Each of the control gains Kpb, Kpc, Kpd2, and Kpe2 in the torque ripple compensation control can be set to a value larger than the ultimate sensitivity gain Kc (Kpb, Kpc, Kpd2, Kpe2>Kc). As a result, it is possible to sensitively respond to the torque fluctuation due to the torque ripple. As a result, the deviation can be instantaneously reduced to zero. Further, the control gains Kpp, Kpq, Kpd1, and Kpe1 in the pressing-force feedback control can be set to values smaller than the ultimate sensitivity gain Kc (Kpp, Kpq, Kpd1, Kpe1<Kc). As a result, the stability as the whole device can be ensured. Here, the ultimate sensitivity gain Kc is a control gain (proportional gain) at the boundary between the stable state and the unstable state in the response of the feedback control.

<Target Pressing-force Calculation Block FBT and the Like of Another Embodiment>

Figure 10:
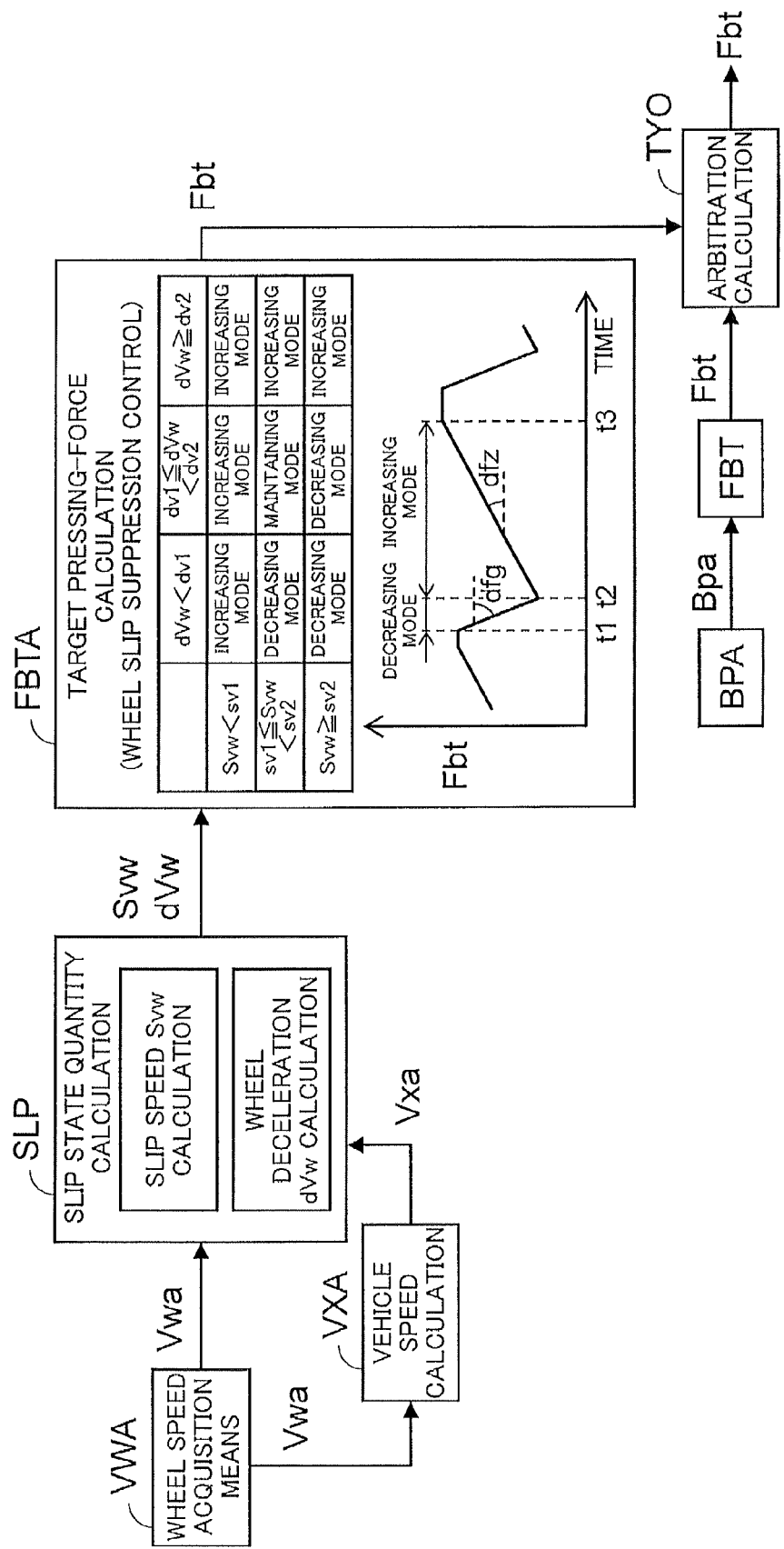
FIG. 10 is a functional block diagram illustrating a target pressing-force calculation block FBT illustrated in FIG. 3 according to another embodiment of the present invention.

In the embodiment described referring to FIG. 3, the target pressing force Fbt is calculated based on the braking operation amount Bpa in the target pressing-force calculation block FBT. On the other hand, when slip suppressing control for suppressing slip of the wheel (locking tendency or spinning tendency) such as the anti-skid control or the traction control is performed, the target pressing force Fbt can be calculated based on the slip state of the wheel. FIG. 10 is a functional block diagram illustrating an embodiment of the present invention when the target pressing force Fbt is calculated by the slip suppression control (ABS and TCS).

First, the speed (Vwa) of each of the wheels is acquired (detected) by the wheel speed acquisition means VWA. In a vehicle speed calculation block VXA, a vehicle speed (vehicle-body speed) Vxa is calculated based on the speeds Vwa of the respective wheels and a known method. For example, the highest wheel speed of the four wheels of the vehicle can be calculated as the vehicle speed Vxa.

In a slip state quantity calculation block SLP, slip state quantities, each indicating a slip state of the wheel, are calculated based on the wheel speeds Vwa, the vehicle speed Vxa, and a known method. For example, as the slip state quantity, a slip speed Svw, which is a difference between the vehicle speed Vxa and the wheel speeds Vwa, is calculated. As the slip state quantity, an acceleration dVw of the wheel is calculated.

In a target pressing-force calculation block FBTA, the target value (target pressing force) Fbt of the pressing force in the case where the slip suppression control is performed is calculated based on the slip state quantities Svw (wheel slip speed) and dVw (wheel acceleration) of the wheel. For example, in the anti-skid control (ABS), a calculation characteristic (calculation map) partitioned by threshold values (predetermined values) sv1 and sv2 of the wheel slip speed Svw and threshold values (predetermined values) dv1 and dv2 of the wheel acceleration dVw is set. In accordance with a control mode (decreasing mode, maintaining mode, or increasing mode) of each section, the target pressing force Fbt can be calculated. In the decreasing mode, the Fbt is decreased with a temporal gradient (change amount for unit time) dfg. In the maintaining mode, the Fbt is maintained constant. In the increasing mode, the Fbt is increased with a temporal gradient dfz. The temporal gradients dfg and dfz are preset to be stored in the ECU.

Moreover, even in the case of the traction control (TCS), the target pressing force Fbt is calculated based on the wheel slip state quantities Svw and dVw. As in the case of the ABS, a threshold value for the Svw and a threshold value for the dVw are preset. The Fbt is increased so as to suppress an acceleration slip of the wheel when the Svw and the dVw exceed the threshold values. Then, after the Svw and the dVw become equal to or smaller than the threshold values so that the acceleration slip of the wheel falls within a proper range, the Fbt is decreased.

In an arbitration calculation block TYO, the Fbt (output from the FBT, which is described referring to FIG. 3) calculated based on the Bpa and the Fbt (output from the FBTA) calculated based on the Vwa are arbitrated. Specifically, priority is put on the target pressing force Fbt calculated based on the wheel speeds Vwa over the Fbt calculated based on the Bpa, and the target pressing force Fbt is output from the TYO. Based on the Fbt output from the TYO, the feedback control for compensating for the torque ripple as those in the first to third embodiments (see FIGS. 5 to 7) is performed.

<Functions and Effects>

Hereinafter, the functions and effects of the torque ripple compensation control in the torque ripple compensation control block TRL (TRF and TRB; see FIGS. 3 to 8 and 10) of each of the embodiments are described.

The torque ripple is a phenomenon in which a pulsation is generated in the output (for example, the torque) of the electric motor because of a density distribution of the magnetic flux under an interaction between a magnetic flux generated by the stator winding and a magnetic flux generated by the magnet and the effects of a stator slot shape and a rotor polar shape. The torque ripple compensation control is control for reducing the effects of the pulsation to improve the control accuracy for the braking torque. The torque ripple compensation control (block TRL) includes the torque ripple compensation feedforward control (block TRF) using the feedforward control and the torque ripple compensation feedback control (block TRB) using the feedback control.

In the torque ripple compensation feedforward control, the calculation characteristic, which is preset based on the actual rotation angle of the electric motor and the torque fluctuation over one revolution of the MTR, is used to calculate the torque ripple compensation feedforward energization amount Ift. The torque ripple is cancelled out by the Ift. Therefore, even when the depression and return of the braking operation member (brake pedal) BP are performed gently, the braking torque for the wheels can be controlled smoothly. Moreover, even when the pressing force is gently increased or decreased by the slip suppression control (such as the anti-skid control or the traction control), the braking torque for the wheels can be controlled smoothly. In particular, the braking torque is increased with good accuracy in the anti-skid control. Therefore, the braking performance and the stability of the vehicle can be properly ensured.

Moreover, in the torque ripple compensation feedforward control, the phase difference between the actual torque ripple and the torque ripple compensation torque by the Ift is reduced based on the rotating angular speed dMka of the electric motor. When the rotation angular speed increases, the phase lag of the torque ripple reduction torque generated by the Ift calculated from the Mka becomes larger. Therefore, the amount of phase lag can be corrected by the delay time Tph which is calculated based on the dMka. Further, when the MTR is rotating at high speed (when dMka≥dmk), the torque ripple compensation feedforward energization amount Ift is calculated to be "0" to stop the torque ripple compensation feedforward control. As a result, the control is allowed only when the control is required, and the execution of unnecessary control can be suppressed.

In the torque ripple compensation feedback control, the torque ripple compensation feedback energization amount Ibt is calculated based on the positional deviation (rotation angle deviation) ΔMk of the electric motor or the pressing-force deviation ΔFb. For example, the Ibt can be calculated by setting the control gain Kpb, Kpc, Kpd2, or Kpe2 of the feedback control to a value larger than the ultimate sensitivity gain Kc. By the Ibt, the torque fluctuation due to the torque ripple can be promptly coped with. As a result, the deviation of the pressing force can be instantaneously reduced to zero. Further, the range of application of the torque ripple compensation feedback control is limited to the range (from mkt to mk2 or from fb3 to fb4) corresponding to the torque ripple. Outside of the range, the pressing-force feedback control is performed. For example, in the pressing-force feedback control, the control gain Kpp, Kpq, Kpd1, or Kpe1 is set to a value which is smaller than the ultimate sensitivity gain Kc. As a result, the stability as the whole control system of the brake actuator can be ensured. By the Ibt, the excess and deficiency of the energization amount due to the torque ripple are compensated for. Therefore, even when the depression and return of the braking operation member (brake pedal) BP are performed gently, the braking torque on the wheels can be controlled smoothly.

Moreover, even when the pressing force is increased or decreased gently by the slip suppression control (anti-skid control or traction control), the braking torque on the wheels can be controlled smoothly. In particular, the braking torque can be increased with good accuracy in the anti-skid control. As a result, the braking performance and the stability of the wheels can be properly ensured.

In the pressing-force feedback control for compensating for the error of the pressing force and the torque ripple compensation feedback control, the pressing-force deviation ΔFb or the positional deviation ΔMk, which have the same state quantity, can be used. Therefore, the calculation characteristics (calculation maps) CHp and CHc or CHq and CHb, which are used for the calculation of the feedback energization amounts Ipt and Ibt, can be combined into one (see FIG. 7). As a result, the calculation processing in the ECU is simplified.

<Description of Target Correlation Value and Actual Correction Value>

In each of the embodiments described above, in the torque ripple compensation control, the feedback control based on the target pressing force (target value of the force of the MSB for pressing the KTB) Fbt and the actual pressing force (actual pressing force acquired by the FBA) Fba is adopted (feedback control based on the "pressing force"). Moreover, the feedback control based on the target position Mkt of the electric motor and the actual position Mka of the electric motor is adopted (feedback control based on the "position of the electric motor"). The specifications of the BRK (the stiffness of the CPR, the gear ratio of the GSK, the lead of the KTH, and the like) are known. Therefore, based on the state quantities indicating actuation states of movable members which are located in a power transmission path from the electric motor MTR to the friction members MSB, the "pressing force" can be calculated. Therefore, in place of the above-mentioned feedback control based on the "pressing force" or the "position of the electric motor", the effects of the torque ripple can be compensated for based on the above-mentioned "state quantities indicating the actuation states of the movable members".

Target values of the "state quantities indicating the actuation states of the movable members" are referred to as "target correlation values", whereas actual values thereof are referred to as "actual correlation values". Here, the "correlation value" is a value correlated with the "pressing force" of the friction members MSB on the rotating member KTB. As the actual correlation value, the state quantity from the output of the MTR to the pressing force of the MSB on the KTB can be acquired (detected). Specifically, at least one of the "actual correlation values (actual values)" shown in Table 1 below can be acquired. Here, the "actual correlation value" is a physical quantity relating to at least any one of the "force" and the "position". A target to be controlled by the BRK is the braking torque on the wheels. Therefore, the state quantities relating to the "force" (thrust (pressing force) and rotating force (torque)) are acquired as the actual correlation values. For example, the actual output torque (rotating force) of the electric motor, the actual thrust in the KTH, and the actual pressing force Fba of the MSB can be adopted as the actual correlation values described above.

TABLE 1

|   | Portion in power transmission path | Target correlation value (target value) Svt (collective designation) | Actual correlation value (actual value) Sva (collective designation) | Acquisition means SVA (collective designation) |
|---|---|---|---|---|
| 1 | Electric motor MTR | Target output (target torque) | Actual output (actual torque) | Not shown |
| 2 |  | Target position Mkt (target rotation angle) | Actual position Mka (actual rotation angle) | MKA |
| 3 | Reducer GSK | Target transmission force (target torque) | Actual transmission force (actual torque) | Not shown |
| 4 |  | Target position (target rotation angle) | Actual position (actual rotation angle) | Not shown |
| 5 | Rotation/linear motion conversion mechanism KTH | Target transmission force (target thrust) | Actual transmission force (actual thrust) | Not shown |
| 6 |  | Target position (target stroke) | Actual position (actual stroke) | Not shown |
| 7 | Friction member MSB | Target pressing force Fbt (target depression force) | Actual pressing force Fba (actual depression force) | FBA |
| 8 |  | Target position (target stroke) | Actual position (actual stroke) | Not shown |

The stiffness (spring constant) of the whole BRK including the brake caliper CPR and the like is known. Therefore, if the "position" is acquired (detected), the above-mentioned "force" can be calculated. Therefore, the state quantities relating to the above-mentioned "position" can be acquired as the actual correlation values. For example, the actual position (rotation angle) Mka of the electric motor, the actual position (stroke) in the KTH, and the actual position of the MSB can be adopted as the actual correlation values. Moreover, by using the above-mentioned "stiffness", the above-mentioned "force" and the above-mentioned "position" can be converted and calculated. Therefore, the output state quantity (estimate value) relating to the "position", which is converted from the "force", or the state quantity (estimate value) relating to the "force", which is converted from the "position", can also be used as the actual correlation values. For example, a position estimate value Mks calculated from the Fba or a pressing-force estimate value Fbs calculated from the Mka can be used as the actual correlation values.

The target correlation value corresponds to the actual correlation value as the same physical quantity. In Table 1 shown above, the target correlation values and the actual correlation values are correlated with each other. Specifically, the target position Mkt of the electric motor, which corresponds to the Mka, and the target value Fbt of the pressing force, which corresponds to the Fba, are used. Further, a target torque corresponding to the actual output torque of the electric motor, a target thrust corresponding to the actual thrust in the KTH, a target position corresponding to the actual position in the KTH, or a target position corresponding to the actual position of the MSB can be adopted.

As described above, in the feedback control including the torque ripple compensation, the torque ripple compensation feedback energization amount Ibt (or Ibt+Ipt) is calculated based on the deviation (correlation value deviation) ΔSv between the target correlation value Svt and the actual correlation value Sva. For example, the Ibt (or Ibt+Ipt) can be calculated by setting the control gain (for example, Kpb, Kpc, Kpd2, or Kpe2) of the feedback control to a value larger than the ultimate sensitivity gain Kc. As a result, the torque fluctuation due to the torque ripple can be promptly coped with. As a result, the deviation of the pressing force can be instantaneously reduced to zero. Further, the range of application of the torque ripple compensation feedback control is limited to the range (from mkt to mkt or from fb3 to fb4) corresponding to the torque ripple. Outside of the range, the normal feedback control (pressing-force feedback control) is performed. For example, in the normal feedback control, the control gain (for example, Kpp, Kpq, Kpd1, or Kpe1) is set to a value which is smaller than the ultimate sensitivity gain Kc. As a result, the stability as the whole control system of the brake actuator can be ensured. Here, the range corresponding to the torque ripple is a range corresponding to the fluctuation range from the median (mean value) of the torque ripples and corresponds to the maximum value of the amplitude of the correlation value deviation ΔSv (=Svt−Sva) which may be generated by the torque ripple. By the Ibt (or Ibt+Ipt), the excess and deficiency of the energization amount due to the torque ripple are compensated for. Therefore, even when the depression and return of the braking operation member (brake pedal) BP are performed gently, the braking torque on the wheels can be controlled smoothly. Moreover, even when the braking torque is increased or decreased gently by the slip suppression control such as the anti-skid control, the braking torque can be controlled with high accuracy.

The invention claimed is:

1. A vehicle brake control device, comprising:
operation amount acquisition means for acquiring an operation amount of a braking operation member for a vehicle by a driver;
braking means including a friction member configured to be pressed by the braking means against a rotating member fixed to a wheel of the vehicle through intermediation of an electric motor to generate a braking torque for the wheel; and
control means for calculating a target energization amount based on the operation amount and controlling the electric motor based on the target energization amount;
wherein the control means is configured to:
calculate a target correlation value correlated with a target pressing force of the friction member on the rotating member based on the operation amount;
calculate a difference between the target correlation value and an acquired actual correlation value correlated with an actual pressing force of the friction member on the rotating member as a correlation value deviation;
calculate a feedback energization amount for adjusting the target energization amount to make the correlation value deviation closer to zero based on the correlation value deviation, the feedback energization amount having a characteristic of monotonically increasing with respect to an increase of the correlation value deviation;
calculate a first compensation energization amount for adjusting the target energization amount to compensate for an effect of a torque ripple of the electric motor based on the correlation value deviation, the first compensation energization amount having a characteristic of monotonically increasing with respect to an increase of the correlation value deviation from zero to a predetermined value and becoming constant with respect to an increase of the correlation value deviation from the predetermined value; and
calculate the target energization amount based on the feedback energization amount and the first compensation energization amount,
and wherein:
the control means calculates the feedback energization amount using an incremental gradient of the feedback energization amount with respect to the increase of the correlation value deviation, said incremental gradient of the feedback energization amount with respect to the increase of the correlation value deviation being smaller than an incremental gradient corresponding to an ultimate sensitivity of a feedback control system based on the correlation value deviation,
the control means calculates the first compensation energization amount using an incremental gradient of the first compensation energization amount with respect to the increase of the correlation value deviation from zero to the predetermined value, said incremental gradient of the first compensation energization amount with respect to the increase of the correlation value deviation from zero to the predetermined value being larger than the incremental gradient corresponding to the ultimate sensitivity, and
the ultimate sensitivity is a predeterminerd control gain at a stability limit which is a boundary between a stable state in which vibrations of the actual correlation value are attenuated and an unstable state in which the vibrations increase.

2. A vehicle brake control device, comprising
operation amount acquisition means for acquiring an operation amount of a braking operation member for a vehicle by a driver;
braking means including a friction member configured to be pressed by the braking means against a rotating member fixed to a wheel of the vehicle through intermediation of an electric motor to generate a braking torque for the wheel; and
control means for calculating a target energization amount based on the operation amount and controlling the electric motor based on the target energization amount;
wherein the control means is configured to:
calculate a slip state quantity indicating a slip state of the wheel based on an acquired speed of the wheel;
calculate a target correlation value correlated with a target pressing force of the friction member on the rotating member based on the slip state quantity;
calculate a difference between the target correlation value and an acquired actual correlation value correlated with an actual pressing force of the friction member on the rotating member as a correlation value deviation;
calculate a feedback energization amount for adjusting the target energization amount to make the correlation value deviation closer to zero based on the correlation value deviation, the feedback energization amount having a characteristic of monotonically increasing with respect to an increase of the correlation value deviation;
calculate a first compensation energization amount for adjusting the target energization amount to compensate for an effect of a torque ripple of the electric motor based on the correlation value deviation, the first compensation energization amount having a characteristic of monotonically increasing with respect to an increase of the correlation value deviation from zero to a predetermined value and becoming constant with respect to an increase of the correlation value deviation from the predetermined value; and
calculate the target energization amount based on the feedback energization amount and the first compensation energization amount,
and wherein:
the control means calculates the feedback energization amount using an incremental gradient of the feedback energization amount with respect to the increase of the correlation value deviation, said incremental gradient of the feedback energization amount with respect to the increase of the correlation value deviation being smaller than an incremental gradient corresponding to an ultimate sensitivity of a feedback control system based on the correlation value deviation,
the control means calculates the first compensation energization amount using an incremental gradient of the first compensation energization amount with respect to the increase of the correlation value deviation from zero to the predetermined value, said incremental gradient of the first compensation energization amount with respect to the increase of the correlation value deviation from zero to the predetermined value being larger than the incremental gradient corresponding to the ultimate sensitivity, and the ultimate sensitivity is a predetermined control gain at a stability limit which is a boundary between a stable state in which vibrations of the actual correlation value are attenuated and an unstable state in which the vibrations increase.

3. A vehicle brake control device, comprising:

operation amount acquisition means for acquiring an operation amount of a braking operation member for a vehicle by a driver;

braking means including a friction member configured to be pressed by the braking means against a rotating member fixed to a wheel of the vehicle through intermediation of an electric motor to generate a braking torque for the wheel; and control means for calculating a target energization amount based on the operation amount and controlling the electric motor based on the target energization amount;

wherein the control means is configured to:

calculate a target correlation value correlated with a target pressing force of the friction member on the rotating member based on the operation amount;

calculate a difference between the target correlation value and an acquired actual correlation value correlated with an actual pressing force of the friction member on the rotating member as a correlation value deviation;

calculate, based on the correlation value deviation, a first compensation energization amount for adjusting the target energization amount to make the correlation value deviation closer to zero and for compensating for an effect of a torque ripple of the electric motor, the first compensation energization amount having a characteristic of monotonically increasing with a first incremental gradient with respect to an increase of the correlation value deviation from zero to a predetermined value and monotonically increasing with a second incremental gradient smaller than the first incremental gradient with respect to an increase of the correlation value deviation from the predetermined value; and calculate the target energization amount based on the first compensation energization amount, and wherein:

the first incremental gradient is larger than an incremental gradient corresponding to an ultimate sensitivity of a feedback control system based on the correlation value deviation, the second incremental gradient is smaller than the incremental gradient corresponding to the ultimate sensitivity, and the ultimate sensitivity is a predetermined control gain at a stability limit which is a boundary between a stable state in which vibrations of the actual correlation value are attenuated and an unstable state in which the vibrations increase.

4. A vehicle brake control device according to claim 1, wherein the braking means is configured to generate the braking torque for the wheel of the vehicle by pressing the friction member against the rotating member fixed to the wheel through intermediation of the electric motor, wherein the actual pressing force is an acquired force for actually pressing the friction member against the rotating member, and wherein the control means is configured to:

calculate a target pressing force, which is a target value of the force for pressing the friction member against the rotating member, as the target correlation value; and use a pressing-force deviation, which is a difference between the target pressing force and the actual pressing force, as the correlation value deviation.

5. A vehicle brake control device according to claim 1, wherein the control means is configured to:

prestore a calculation characteristic which is set based on a torque fluctuation over a predefined range of a position of the electric motor; and calculate a second compensation energization amount for compensating for the effect of the torque ripple of the electric motor based on an actual position of the electric motor and the calculation characteristic;

wherein the target energization amount is calculated based on the second compensation energization amount in addition to the feedback energization amount and the first compensation energization amount.

6. A vehicle brake control device according to claim 5, wherein the control means is configured to:

calculate a speed of the electric motor based on the actual position of the electric motor; and calculate a delay time for compensating for a phase difference between the torque ripple of the electric motor and the second compensation energization amount based on the speed;

wherein the second compensation energization amount for compensating for the effect of the torque ripple of the electric motor based on the actual position of the electric motor and the calculation characteristic is calculated based on the delay time.

7. A vehicle brake control device according to claim 5, wherein the control means is configured to:

calculate a speed of the electric motor based on the actual position of the electric motor; and calculate the second compensation energization amount to be zero when the speed is equal to or larger than a predetermined speed.

* * * * *